(12) United States Patent
Schrooten et al.

(10) Patent No.: US 8,785,077 B2
(45) Date of Patent: Jul. 22, 2014

(54) APPARATUS AND METHODS FOR CONNECTING FUEL CELLS TO AN EXTERNAL CIRCUIT

(75) Inventors: Jeremy Schrooten, Mission (CA); Mark Petersen, North Vancouver (CA); Jean-Louis Iaconis, Burnaby (CA); David Lo, Burnaby (CA); Paul Sobejko, North Vancouver (CA)

(73) Assignee: Societe BIC, Clichy (FR)

( * ) Notice: Subject to any disclaimer, the term of this patent is extended or adjusted under 35 U.S.C. 154(b) by 212 days.

(21) Appl. No.: 13/172,645

(22) Filed: Jun. 29, 2011

(65) Prior Publication Data

US 2012/0003568 A1   Jan. 5, 2012

Related U.S. Application Data

(63) Continuation-in-part of application No. 12/980,130, filed on Dec. 28, 2010.

(60) Provisional application No. 61/290,450, filed on Dec. 28, 2009.

(51) Int. Cl.
*H01M 4/64* (2006.01)
*H01M 4/66* (2006.01)
*H01M 4/02* (2006.01)

(52) U.S. Cl.
USPC ........... 429/517; 429/519; 429/520; 429/521; 429/522; 429/523

(58) Field of Classification Search
USPC .................. 429/534, 480–481, 517, 519–523
See application file for complete search history.

(56) References Cited

U.S. PATENT DOCUMENTS

| 5,861,221 | A | 1/1999 | Ledjeff et al. |
| 5,989,741 | A | 11/1999 | Bloomfield et al. |
| 6,790,554 | B2 | 9/2004 | May et al. |
| 7,314,677 | B2 | 1/2008 | Mosdale |
| 7,632,587 | B2 | 12/2009 | Mclean et al. |

(Continued)

FOREIGN PATENT DOCUMENTS

| JP | 2003-123792 A | 4/2003 |
| WO | WO-03063286 A1 | 7/2003 |
| WO | WO-2011079377 A1 | 7/2011 |
| WO | WO-2013000078 A1 | 1/2013 |

OTHER PUBLICATIONS

"U.S. Appl. No. 12/980,130, Non Final Office Action mailed Dec. 7, 2012", 9 pgs.

(Continued)

*Primary Examiner* — Ula C Ruccock
*Assistant Examiner* — Osei Amponsah
(74) *Attorney, Agent, or Firm* — Schwegman Lundberg & Woessner, P.A.

(57) ABSTRACT

Various embodiments of the present invention provide a fuel cell connection component, including an interconnect or a current collector. The fuel cell connection component includes conductive fibers oriented at an angle of less than about 90° to at least one electrode in the fuel cell. The fuel cell connection component provides an electrically conductive pathway from the at least one electrode of the fuel cell to an external circuit or to an electrode of a different fuel cell. Embodiments of the present invention also provide fuel cells that include the fuel cell connection component, including fuel cell layers, and methods of making the same.

21 Claims, 9 Drawing Sheets

(56) References Cited

U.S. PATENT DOCUMENTS

| | | | |
|---|---|---|---|
| 2004/0076867 A1* | 4/2004 | Day et al. | 429/32 |
| 2004/0081879 A1 | 4/2004 | Washima et al. | |
| 2005/0058249 A1 | 3/2005 | Wolf et al. | |
| 2006/0269829 A1* | 11/2006 | Choi et al. | 429/44 |
| 2007/0231672 A1* | 10/2007 | Tanaka et al. | 429/42 |
| 2008/0299435 A1 | 12/2008 | Imura et al. | |
| 2009/0081493 A1 | 3/2009 | Schrooten et al. | |
| 2011/0165495 A1 | 7/2011 | Schrooten et al. | |

OTHER PUBLICATIONS

"U.S. Appl. No. 12/980,130, Respnse filed Feb. 20, 2013 to Non Final Office Action mailed Dec. 7, 2012", 9 pgs.

"U.S. Appl. No. 12/980,130, Response filed Sep. 13, 2012 to Restriction Requirement mailed Aug. 14, 2012", 7 pgs.

"U.S. Appl. No. 12/980,130, Restriction Requirement mailed Aug. 14, 2012", 5 pgs.

Kikkawa, T, et al., "Synthesis of LaCr03 by the hydrazine method", Journal of Materials Science Letters 14 (1995), (Feb. 1995), 1071-1073.

"U.S. Appl. No. 12/980,130, Final Office Action mailed Apr. 11, 2013", 13 pgs.

"U.S. Appl. No. 12/980,130, Non Final Office Action mailed Sep. 18, 2013", 14 pgs.

"U.S. Appl. No. 12/980,130, Response filed Jul. 11, 2013 to Final Office Action mailed Apr. 11, 2013", 11 pgs.

"International Application Serial No. PCT/CA2012/050420, International Search Report mailed Sep. 26, 2012", 3 pgs.

"International Application Serial No. PCT/CA2012/050420, Written Opinion mailed Sep. 26, 2012", 5 pgs.

"U.S. Appl. No. 12/980,130, Response filed Jan. 16, 2014 to Non Final Office Action mailed Sep. 18, 2013", 10 pgs.

"International Application Serial No. PCT/CA2012/050420, International Preliminary Report on Patentability mailed Jan. 16, 2014", 7 pgs.

* cited by examiner

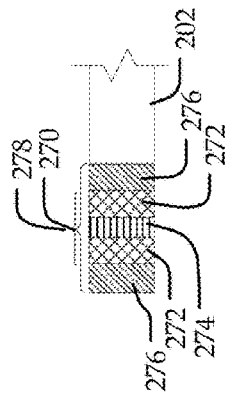
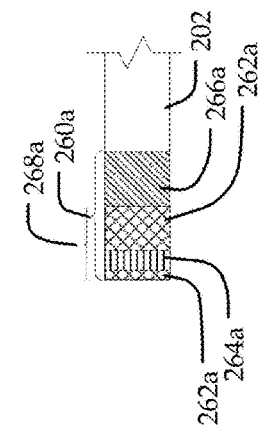
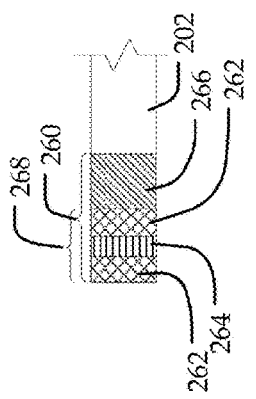
FIG. 4G
FIG. 4H
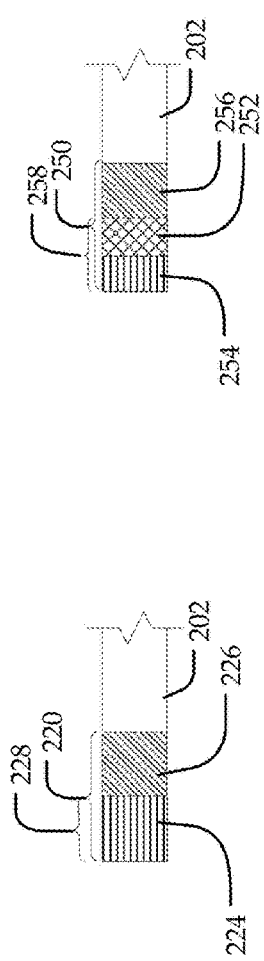
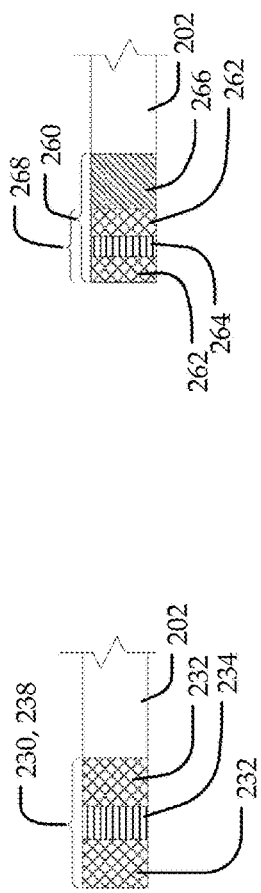
FIG. 4D
FIG. 4E
FIG. 4F
FIG. 4A
FIG. 4B
FIG. 4C

APPARATUS AND METHODS FOR CONNECTING FUEL CELLS TO AN EXTERNAL CIRCUIT

CLAIM OF PRIORITY

This patent application is a continuation-in-part of U.S. patent application Ser. No. 12/980,130, filed Dec. 28, 2010, which claims the benefit of priority under 35 U.S.C. Section 119(e), to U.S. Provisional Patent Application Ser. No. 61/290,450, filed Dec. 28, 2009; which are hereby incorporated by reference herein in its entirety.

BACKGROUND

Fuel cells may be employed as a power supply for an increasing number of large-scale applications, such as materials handling (e.g. forklifts), transportation (e.g. electric and hybrid vehicles) and off-grid power supply (e.g. for emergency power supply or telecommunications). Smaller fuel cells are now being developed for portable consumer applications, such as notebook computers, cellular telephones, personal digital assistants (PDAs), and the like.

In a typical prior art fuel cell stack, electrons travel from the membrane electrode assembly (MEA) of a unit fuel cell through a separator plate to the MEA of the next unit cell. Typically, at each end of a fuel cell stack, current is supplied to or from an external circuit via connection components, including bus plates and connectors. Conventional fuel cell stacks may require numerous seals and the application of compressive force to prevent leakage of fuel and oxidant and to ensure good electrical contact between separator plates, MEAs and bus plates. Fuel cell stacks can therefore require many parts and assembly can be quite complex.

Fuel cells may also be connected in edge-collected configurations, such as planar configurations. In such fuel cell systems, current is collected from the edges of individual unit cells and travels in the plane of the fuel cells. In such fuel cell systems, the spatial arrangement of components may be different from the spatial arrangement of components in a conventional fuel cell stack. In such fuel cell systems, the predominant direction of electron flow may be different from the predominant direction of electron flow in a conventional fuel cell stack. In some of such fuel cell systems, the desired properties of components may be different from the desired properties of components in a conventional fuel cell stack.

Some edge-collected or planar fuel cell systems do not employ compressive force in order to maintain good contact between the fuel cell layer and various other components of the fuel cell system. In such fuel cell systems, components may be assembled and held in contact by other means. Accordingly, components that are employed in a conventional fuel cell stack for connection to an external circuit may not be optimal for employment in edge-collected fuel cell systems.

In a single fuel cell, minor electrical resistance from components can be relatively inconsequential. However, when multiple fuel cells are used, such as in a stack or planar fuel cell system, electrical resistance from components can accumulate to create a comparatively large internal resistance within the array. A large internal resistance can decrease performance of a fuel cell system with multiple cells, including a stack or planar fuel cell system.

SUMMARY

Various embodiments of the present invention provide a fuel cell connection component, including an interconnect or a current collector. The fuel cell connection component includes conductive fibers oriented at an angle of less than about 90° to at least one electrode in the fuel cell. The fuel cell connection component provides an electrically conductive pathway from the at least one electrode of the fuel cell to an external circuit or to an electrode of a different fuel cell. Embodiments of the present invention also provide fuel cells that include the fuel cell connection component, including fuel cell layers, and methods of making the same.

Various embodiments of the present invention provide certain advantages over other fuel cell connection components, fuel cells, or fuel cell layers, some of which are surprising and unexpected. One of skill in the art would generally assume that the highest conductivity in a fuel cell connection component using conductive fibers could be achieved by forming the shortest and most direct conductive path in that component. In a fuel cell conducting component, this can involve arranging a first set of conductive fibers such that they form a right angle with the electrode. However, for example, surprisingly and unexpectedly, in some embodiments it has been found that by orienting the conductive fibers such that they form an angle of less than 90° with the electrode or electrode coating, such as for example 45°, conductivity of the fuel cell connection component can be higher than that of a fuel cell connection component with the conductive fibers oriented at about 90° to the electrode or electrode coating. Further, for one of skill in the art to arrange conductive fibers in a fuel cell connecting component to achieve the shortest path, this can involve arranging a second set of conductive fibers such that they form an approximate right angle with the first set of conductive fibers (e.g. the first and second set of conductive fibers form a grid), such that the second set of conductive fibers are parallel to the length of the fuel cell conducting component. This is especially the case for interconnects, wherein current can travel along the length of the interconnect to an external circuit. However, in another example, surprisingly and unexpectedly, by including a first set of conductive fibers and a second set of conductive fibers in the fuel cell connection component, both of which form an angle of less than about 90° with the electrode or electrode coating, such as for example 45°, and each of which forms an approximately 90° angle with each other (e.g. the first and second set of conductive fibers form a grid), conductivity of the fuel cell connection component is higher than that of a fuel cell conducting component that includes a first and second set of conductive fibers, one of which forms an approximately 90° angle with the electrode or electrode coating, and each of which forms an approximately 90° angle with one another. In another example, the conductive fibers of some embodiments of the present invention are more firmly bonded and more difficult to pull out of the fuel cell connection component than in other fuel cell connection components, including fuel cell connection components that have conductive fibers oriented at an approximately 90° angle with the electrode or electrode coating, and including fuel cell connection components that have a first set of conductive fibers oriented at an approximately 90° angle with the electrode or electrode coating and a second set of conductive fibers oriented at an approximately 90° angle with respect to the first set of conductive fibers. In another example, some embodiments of the present invention can have greater strength or durability than other fuel cell connection components. In another example, some embodiments of the present invention can be made using less compressive force than other fuel cell connection components. In another example, some embodiments of the present invention that do not include conductive fibers oriented approximately along the length of the fuel cell connection component can be more flexible or less rigid than other fuel cell connection components, including more flexible than fuel cell components that include conductive fibers oriented approximately parallel to the length of the component. In a another example, surprisingly and unexpectedly, some embodiments of the fuel cell connection component can have the advantages discussed herein, including higher conductivity, more secure binding of conductive fibers, greater strength, greater durability, or less compressive force needed during manufacture, without an increase in complexity, price, changes in materials, or other substantial changes in manufacturing processes.

The present invention provides a fuel cell connection component. The fuel cell connection component includes a non-conductive interface region. The non-conductive interface region has a first surface and a second surface. The fuel cell connection component also includes an electron conducting component. The electron conducting component has two surfaces and a length that is parallel to the two surfaces of the electron conducting component. One of the surfaces of the electron conducting component is disposed adjacent to the second surface of the interface region. The electron conducting component includes conductive fibers. The conductive fibers are oriented approximately parallel to the two surfaces of the electron conducting component. The conductive fibers are adapted to be oriented at an angle of less than about 90° to at least one electrode in a fuel cell. The fuel cell connection component also includes a binder. The binder holds the interface region and the electron conducting component together. The fuel cell connection component is adapted for use in the fuel cell such that it provides an electrically conductive path between the at least one electrode or the fuel cell and an external circuit or between the at least one electrode of the fuel cell and at least one electrode of a different fuel cell.

The present invention provides a fuel cell. The fuel cell includes an ion conducting component. The fuel cell also includes two or more electrode coatings. The fuel cell also includes one or more fuel cell connection components. The fuel cell connection components include a non-conductive interface region. The non-conductive interface region has a first surface and a second surface. The first surface of the non-conductive interface region is in contact with the ion conducting component. The fuel cell connection components also include an electron conducting component. The electron conducting component has two surfaces and a length that is parallel to the two surfaces of the electron conducting component. One of the surfaces of the electron conducting component is disposed adjacent to the second surface of the interface region. The electron conducting component includes conductive fibers. The conductive fibers are oriented approximately parallel to the two surfaces of the electron conducting component. The conductive fibers are oriented at an angle of less than about 90° to one of the electrode coatings. The electron conducting component provides an electrically conductive pathway between the one electrode coating and an external circuit or between the one electrode coating and an electrode coating of another fuel cell. The pathway extends along the length of the electron conducting component.

The present invention provides a fuel cell layer. The fuel cell layer includes a composite layer. The composite layer includes a first surface and a second surface. The composite layer includes a plurality of fuel cell connection components. The composite layer includes a plurality of ion conducting components. The ion conducting components are positioned between the fuel cell connection components. The composite layer also includes a first plurality of electrode coatings. The first plurality of electrode coatings are disposed on the first surface to form anodes. The composite layer also includes a second plurality of electrode coatings. The second plurality of electrode coatings is disposed on the second surface to form cathodes. Each of the first and second plurality of electrode coating is in ionic contact with one of the ion conducting components and in electrical contact with one of the fuel cell connection components. At least one of the fuel cell connection components includes an interface region. The interface region has a first surface and a second surface. The first surface is in contact with one of the ion conducting components. The at least one fuel cell connection component also includes at least one electron conducting component. The at least one electron conducting component has two surfaces and a length parallel to the two surfaces. One of the surfaces of the at least one electron conducting component is disposed adjacent to the second surface of the interface region. The at least one electron conducting component includes conductive fibers. The conductive fibers are oriented approximately parallel to the two surfaces of the at least one electron conducting component. The conductive fibers are oriented at an angle of less than about 90° to at least one of the first or second plurality of electrode coatings. At least one of the fuel cell connection components provides an electrically conductive pathways between the at least one of the first or second plurality of electrode coatings and an external circuit or between one of the first or second plurality of electrode coatings and a different one of the first or second plurality of electrode coatings. The pathway extends along the length of the at least one electron conducting component.

Embodiments of the present invention relate to a fuel cell including, an ion conducting component, two or more electrode coatings and one or more interconnects. The interconnects include a non-conductive interface region having a first surface and a second surface in which the first surface is in contact with the ion conducting component, an electron conducting component having two surfaces and a length that is parallel to the two surfaces wherein one of the surfaces is disposed adjacent to the second surface of the interface region. The electron conducting component provides an electrically conductive pathway between one of the electrode coatings and an external circuit, said pathway extending along the length of the electron conducting component.

Embodiments of the present invention also relate to a fuel cell layer including a composite layer having a first surface and a second surface, the composite layer including a plurality of current collectors and a plurality of ion conducting components positioned between the current collectors, a plurality of anode coatings disposed on the first surface and a plurality of cathode coatings disposed on the second surface, each coating in ionic contact with one of the ion conducting components and in electrical contact with one of the current collectors. At least one of the current collectors includes an interface region having a first surface and a second surface, the first surface in contact with one of the ion conducting components; and, an electron conducting component having two surfaces and a length parallel to the two surfaces, one of the surfaces disposed adjacent to the second surface of the interface region; and wherein the at least one of the current collectors provides an electrically conductive pathway between one of the electrode coatings and an external circuit, said pathway extending along the length of the electron conducting component.

Embodiments of the present invention also relate to a method of making an interconnect for a planar fuel cell including contacting a first electrically conductive material and a second electrically conductive material, sufficient to form a layered structure, curing the layered structure sufficient to provide a preform, optionally coating the preform sufficient to provide a coated preform, optionally disposing a filler on the preform, optionally activating the preform, curing the preform sufficient to provide an interconnect sheet and optionally cutting the interconnect sheet, sufficient to form interconnects.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 4A-4H are truncated sectional views of an interconnect within a unit cell, according to several example embodiments.

DETAILED DESCRIPTION

Figure 1A:
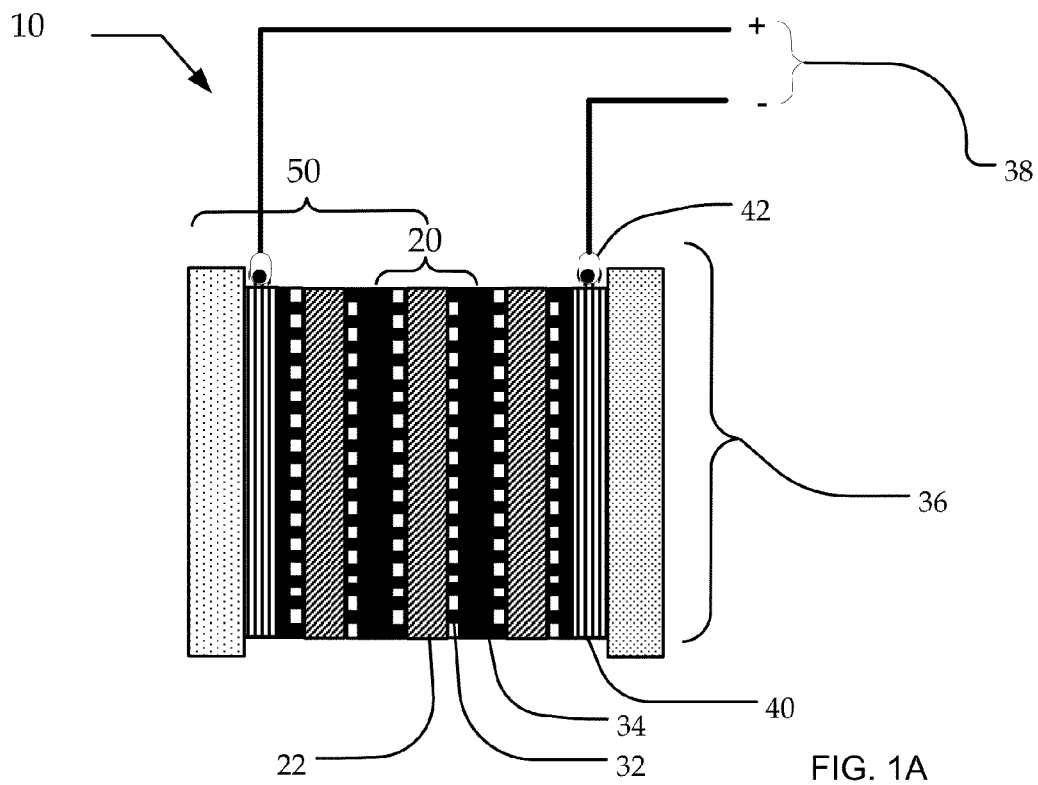
FIGS. 1A-B are cross-sectional schematic diagrams of a conventional prior art fuel cell stack.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects.

Embodiments of the present invention describe fuel cell interconnect components and fuel cell architectures that provide a means of connecting a circuit to the ends of a fuel cell layer. Embodiments also provide a more conductive path along the current collector path length where current is higher. Additionally, embodiments provide a conductive but corrosion resistant interface to the electrochemical components in a fuel cell system. Current collector and interconnect designs of the present embodiments may include two different types of materials, with different conductivities and contamination properties used in combination to provide high conductivity where needed while also preventing the introduction of corrosion properties into the fuel cell layer.

Provided are interconnects, for connecting an edge-collected fuel cell layer to an external circuit. Interconnects include electron conducting components and optionally, interface regions. Electron conducting components include one or more electrically conductive materials. Electron conducting components may include two or more electron conducting regions, having different composition. Interface regions include one or more non-conductive materials.

Provided are fuel cells, fuel cell layers and fuel cell systems including interconnects. Interconnects may be employed in a fuel cell, fuel cell layer or fuel cell system to provide high electrical conductivity in a direction that is parallel to the length of the fuel cell while isolating active components of the fuel cell from contamination with corrosion products. Interconnects of some embodiments may be included in fuel cell systems that do not employ compressive force to maintain contact between components of the fuel cell system. In some embodiments, interconnects may be simpler to connect to an external circuit.

Embodiments of the invention have been described as proton exchange membrane (PEM) fuel cells or components of PEM fuel cells. However, embodiments of the invention may be practiced with other types of fuel cells, such as alkaline fuel cells or solid oxide fuel cells. Embodiments of the invention may also have application in other types of electrochemical cells, such as electrolyzers or chlor-alkali cells.

Fuel cell assemblies according to some embodiments may be used as a source of power for various applications. For example, fuel cell systems may be used to power portable consumer devices, such as notebook computers, cellular telephones or PDAs. However, the invention is not restricted to portable consumer devices and embodiments may be practiced to power larger applications, such as materials handling applications, transportation applications or off-grid power generation; or other smaller applications.

Embodiments of the invention may be practiced with fuel cells of a variety of different designs. Described herein is the practice of embodiments with planar fuel cells. However, the same or other embodiments may alternatively be practiced with other types of edge-collected fuel cells. For ease of reference, throughout the description, fuel cells and related technology are referred to as "planar" fuel cells, "planar" fuel cell assemblies or "planar" fuel cell layers. However, it is to be understood that fuel cells may not be planar and edge-collected fuel cells need not be planar to be practiced with the invention. For example, unit fuel cells may not all lie in the same plane (e.g. they may be flexible, spiral, tubular, or undulating).

DEFINITIONS

As used herein, "catalyst" refers to a material or substance that assists in starting or increasing the rate of a reaction, without being modified or consumed itself. Catalyst layers may comprise any type of electrocatalyst suitable for the application at hand. Catalysts or catalyst layers may include pure platinum, carbon-supported platinum, platinum black, platinum-ruthenium, palladium, copper, tin oxide, nickel, gold, mixtures of carbon black and one or more binders. Binders may include ionomers, polypropylene, polyethylene, polycarbonate, polyimides, polyamides, fluoropolymers and other polymer materials, and may be films, powders, or dispersions. An example of a polyimide includes Kapton®. An example of a fluoropolymer is PTFE (polytetrafluoroethylene) or Teflon®. Other fluoropolymers include PFSA (perfluorosulfonic acid), FEP (fluorinated ethylene propylene), PEEK (poly ethylene ether ketones) and PFA (perfluoroalkoxyethylene). The binder may also include PVDF (polyvinylidene difluoride) powder (e.g., Kynar®) and silicon dioxide powder. The binder may include any combination of polymers or ionomers. The carbon black may include any suitable finely divided carbon material such as one or more of acetylene black carbon, carbon particles, carbon flakes, carbon fibers, carbon needles, carbon nanotubes, and carbon nanoparticles.

As used herein, "coating" refers to a conductive thin-layer disposed on the surface of a composite layer. For example, the coating may be a catalyst layer or electrodes, such as anodes and cathodes.

As used herein, a "composite layer" or "composite" refers to a layer including at least two surfaces having a thickness, where one or more ion conducting passages and one or more electrically conductive passages are defined between the surfaces. Ion conducting properties and electrically conductive properties of a composite can be varied in different regions of the composite by defining ion conducting passages and electrically conductive passages with varying sizes, shapes, densities or arrangements. A composite layer may also include one or more interface regions. A composite layer may be impermeable, or substantially impermeable, to a fluid (e.g. a gas or a liquid).

As described herein, an "electron conducting component" refers to a component of a composite layer that provides an electrically conductive pathway. The electron conducting component may provide an electrically conductive pathway, or pathways, from one surface of a composite layer, through the composite, to the opposite surface of the composite layer, for example. Electron conducting components include one or more materials that are electrically conductive, for example, metals, metal foams, carbonaceous materials, electrically conductive ceramics, electrically conductive polymers, combinations thereof, and the like. Electron conducting components may also include materials that are not electrically conductive. Electron conducting components may also be referred to herein as "current conducting components," "current collectors," "interconnects," or "fuel cell connection components."

As used herein, an "ion conducting component" refers to a component that provides an ion conducting passage. Ion conducting components may be components of a composite. Ion conducting components include an ion conducting material, such as a fluoropolymer-based ion conducting material or a hydrocarbon-based ion conducting material. Ion conducting components may also be referred to herein as "electrolytes" or "electrolyte membranes".

As used herein, an "interface region" refers to a component of a composite layer that is not electrically conductive. An interface region may comprise a material which exhibits negligible ionic conductivity and negligible electrical conductivity, for example. Interface regions may be used in conjunction with electron conducting regions to form current collectors, and in such cases may be disposed adjacent electron conducting regions on one or both sides of the electron conducting region. Electron conducting regions may be embedded in an interface region to form a current collector. It is to be understood that an interface region (or interface regions) is an optional component in a current collector, not a necessary component. When used as a component of a current collector, an interface region may be used to promote adhesion between electron conducting regions and ion conducting components, and/or may be used to provide electrical insulation between adjacent electrochemical cells.

As used herein, "fuel" refers to any material suitable for use as a fuel in a fuel cell. Examples of fuel may include, but are not limited to hydrogen, methanol, ethanol, butane, borohydride compounds such as sodium or potassium borohydride, formic acid, ammonia and ammonia derivatives such as amines and hydrazine, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane.

As used herein, "plane" refers to a two-dimensional hypothetical surface having a determinate extension and spatial direction or position. For example, a rectangular block may have a vertical plane and two horizontal planes, orthogonal to one another. Planes may be defined relative to one another using angles greater or less than 90 degrees, for example.

As used herein, "fuel cell connection component" refers to a fuel cell interconnect or a fuel cell current collector, or other connection component that directly or indirectly creates an electrical pathway including between at least one electrode of the fuel cell and an external circuit or that directly or indirectly creates an electrical pathway including between at least one electrode of the fuel cell and at least one other electrode of the fuel cell.

As used herein, "interconnect" refers to a fuel cell connection component wherein the interconnect directly or indirectly creates an electrical pathway including between at least one electrode of the fuel cell and an external circuit. In some embodiments, the interconnect can create an electrical pathway between one electrode of the fuel cell and another electrode of the fuel cell, which can in turn allow current to flow to an external circuit through other connection components; thereby, indirectly creating an electrical pathway between at least one electrode of the fuel cell and the external circuit. In some embodiments, an interconnect can be a current collector.

As used herein, "current collector" refers to a fuel cell connection component wherein the current collector directly or indirectly creates an electrical pathway including between at least one electrode of the fuel cell and at least one other electrode of the fuel cell. In some embodiments, the current collector can create an electrical pathway between one electrode of the fuel cell and an external circuit through other connection components, which can in turn allow current to flow to another electrode of the fuel cell through other connection components; thereby, indirectly creating an electrical pathway between at least one electrode of the fuel cell and at least one other electrode of the fuel cell. In some embodiments, a current collector can be an interconnect.

As used herein, "binder" refers to a material that can bind or hold materials together. For example, a binder can be a non-conductive material, such as a polymer or a polymer mixture, and can be curable. In some embodiments, a binder can be any suitable epoxy or epoxy resin that can bind materials together. A binder can be any suitable thermoset or thermoplastic polymer.

A conventional prior art fuel cell stack 10 is shown in FIG. 1A. Fuel cell stack 10 has unit fuel cells 20, which may be arranged in series. Fuel cells 20 may, for example, include proton exchange membrane (PEM) fuel cells. Fuel cells 20 each include a membrane electrode assembly (MEA) 22 having a cathode, an anode, a proton exchange membrane and gas diffusion layers (not shown). Electrons liberated at the anode travel through landings 32 in a separator plate 34 to the cathode in the MEA of the next unit cell. Electrons liberated at the anode in the MEA of the last unit cell travel through connection components 36 to an external circuit 38. Electrons travel from a separator plate 34 to a bus plate 40 which is connected via a connector 42 to external circuit 38.

Figure 1B:
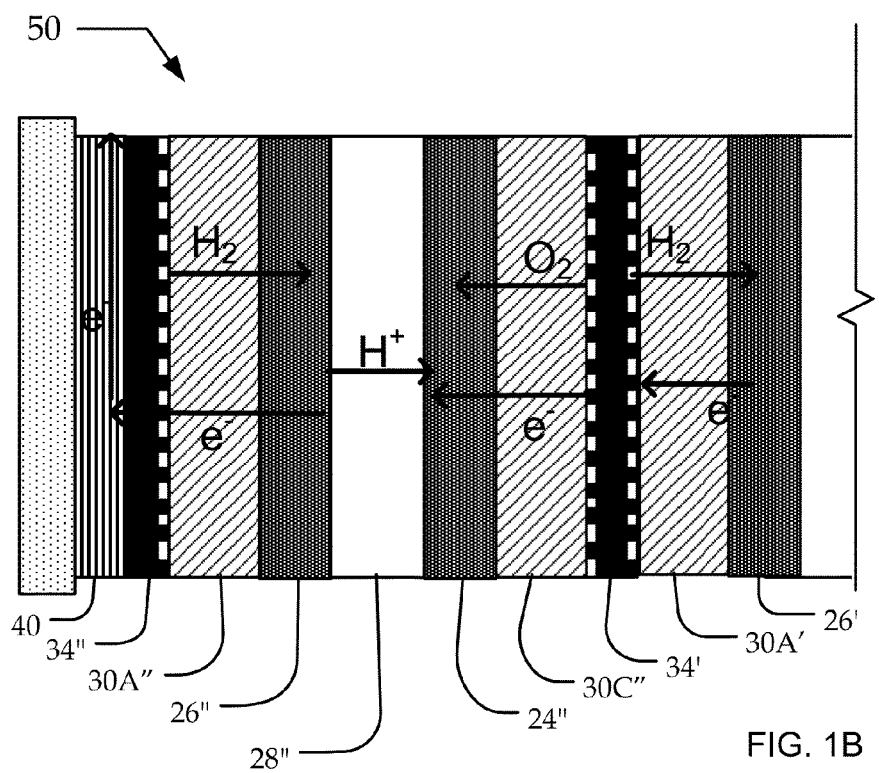

FIG. 1B shows a schematic sectional view of the electron flow through a portion 50 of the fuel cell stack of FIG. 1A. The fuel (e.g. hydrogen) travels through first separator plate 34' through GDL 30A' and reacts at anode 26' liberating electrons and protons. Electrons travel through first separator plate 34' through GDL 30C" and cathode 24" of the next unit cell. Electrons travel through separator plate 34' in a direction that is perpendicular to the plane of the separator plate 34' (or perpendicular to the surfaces that bound its length). The electrons that are liberated at anode 26" travel through separator plate 34" in a direction that is perpendicular to the plane of the plate into bus plate 40.

Since the predominant direction of current flow through a separator plate is through-plane (i.e. perpendicular to the plane of the plate or to the two surfaces with the greatest area), separator plates employed in conventional fuel cell stacks must have high through-plane electrical conductivity. Since electrons travel through the faces of a separator plate (i.e. through the two surfaces with the greatest area), these faces must be electrically conductive. As can be seen, in the conventional fuel cell stack shown, the proton exchange membrane is not in direct physical contact with any of the connection components (i.e. it is not in physical contact with separator plates 34, bus plate 40, or interconnects 42).

Figure 2A:
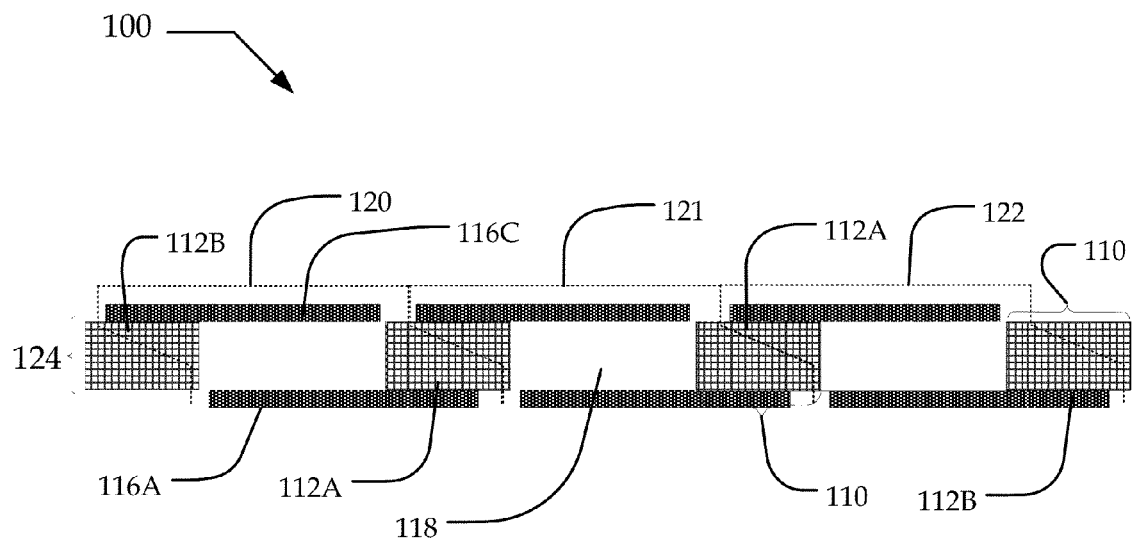
FIGS. 2A and 2B are cross-sectional views of, respectively, a first example planar fuel cell layer and a second example planar fuel cell layer.
Figure 2B:
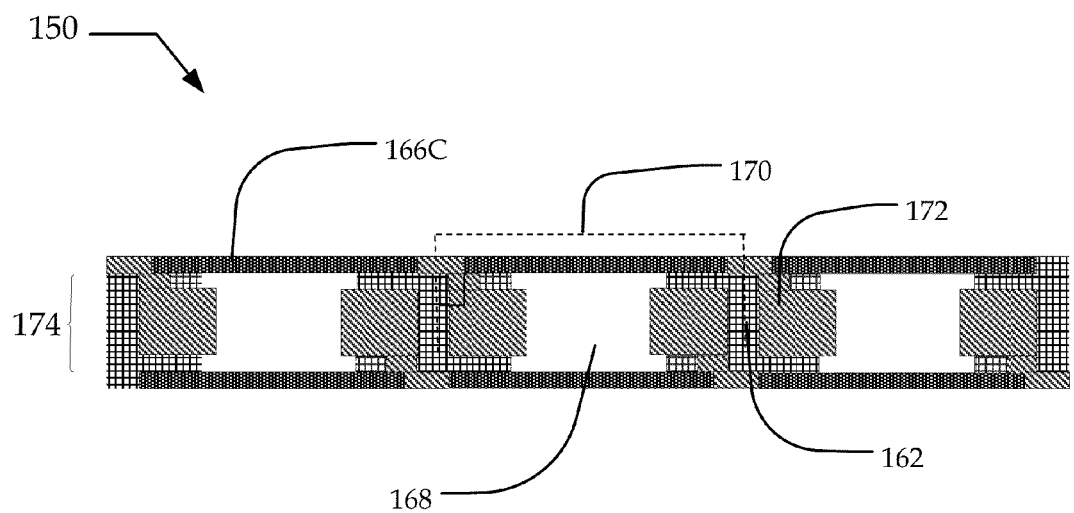

FIG. 2A is a cross-sectional view of an example planar fuel cell layer 100, as described in commonly-owned U.S. Pat. No. 7,632,587 entitled ELECTROCHEMICAL CELLS HAVING CURRENT-CARRYING STRUCTURES UNDERLYING ELECTROCHEMICAL REACTION LAYERS, the entire teachings of which are incorporated herein by reference. Example planar fuel cell layer 100 includes a composite layer 124 having ion conducting components 118 and current collectors 112. In the example fuel cell layer 150 shown in FIG. 2B, composite layer 174 also has substrate regions 172. Substrate regions 172 may include a material that is electrically non-conductive, and may also be ionically non-conductive. Returning to FIG. 2A, fuel cell layer 100 may include two types of electrode coatings, namely cathode coatings 116C and anode coatings 116A. Cathode coatings 116C are disposed on the upper side of composite layer 124 and are adhered to the upper surface of composite layer 124. (Illustrated as 166C and 166A, respectively, in FIG. 2B). Anode coatings 116A are disposed on the lower side of composite 124 and are adhered to the lower surface of composite 124.

Example planar fuel cell layer 100 has three unit fuel cells 120, 121 and 122. Each unit cell is bounded by current collectors 112. Current collectors 112 include inside current collectors 112a (e.g., current collectors that are located inside fuel cell layer 100 between two unit cells) and interconnects 112b (e.g., current collectors that are located on the ends of fuel cell layer 100). In the example planar fuel cell layer shown, inside current collectors 112a and interconnects 112b are the same.

Figure 3A:
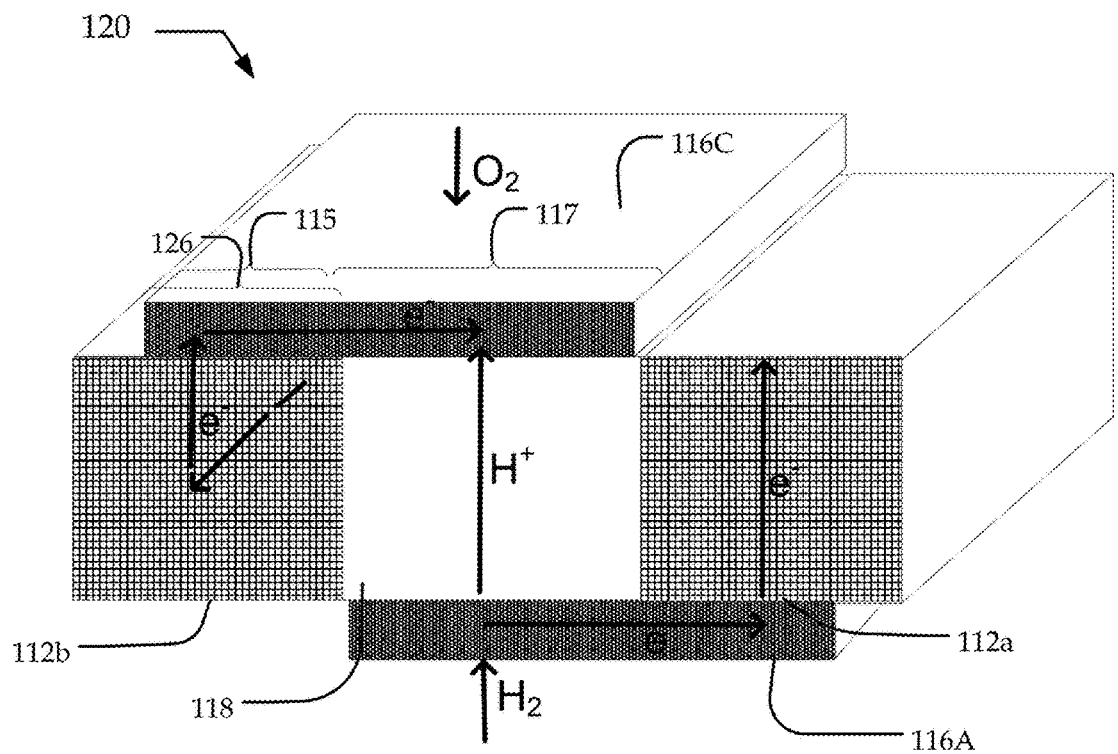
FIGS. 3A-D are perspective schematic and graphical diagrams of unit fuel cell 120 in the example planar fuel cell layer 100.

FIG. 3A is a schematic perspective diagram of unit fuel cell 120. In the embodiment shown, the fuel and oxidant are respectively, hydrogen and oxygen. However, it is to be understood that embodiments of the invention may be used with fuel cells utilizing other combinations of fuel and oxidant. Hydrogen contacts anode coating 116A and is dissociated into protons and electrons. Electrons travel through anode coating 116A in a direction that is parallel to the plane of fuel cell 120 and into and through current collector 112a, which is shared with an adjacent unit cell. Electrons travel through current collector 112a in a direction that is perpendicular to the plane of fuel cell 120, to the cathode coating of the next unit cell. Protons travel through ion conducting component 118 to the reaction site in cathode 116C.

Unit fuel cell 120 is located on an outside edge of fuel cell layer 100 (of FIG. 2A). Electrons travel from an external circuit (not shown) through interconnect 112b in a direction that is parallel to the length (into the page) of fuel cell 120 and along the length of interconnect 112b and then in a direction that is perpendicular to the plane of fuel cell 120 and into the inactive portion 115 of cathode coating 116C. Inactive portion 115, since it is not in contact with ion conducting component 118, does not support the reaction between the oxidant and protons, but rather, acts as a connection component. Thus, together inactive portion 115 and interconnect 112b form connection components 126. Electrons travel from inactive portion 115 to active portion 117 of cathode coating 116C in a direction that is parallel to the plane of both cathode coating 116C, fuel cell layer 100 and interconnect 112b. Oxygen contacts cathode coating 116C and travels to the sites of chemical reaction. Oxygen is reduced and product water is produced, which may either diffuse into the surrounding atmosphere or remain in cathode coating 116C.

Figure 3B:
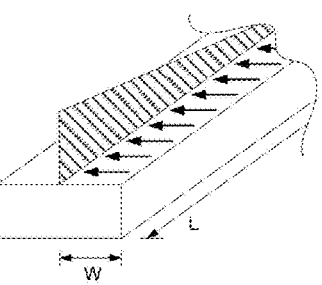
Figure 3C:
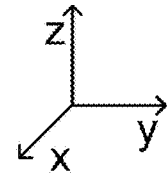
Figure 3D:
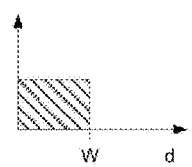

FIG. 3B is a truncated schematic perspective view of current traveling through connection components 126 including an interconnect and optionally, the inactive portion of an electrode coating. FIGS. 3C and 3D are plots of current "i" as a function of distance "d" along length "L" and width "W," respectively of connection components 126 (width W may or may not be the same as the width of interconnect 112b). Current travels from the active portion of the electrode coating through either the inactive portion of the electrode coating or the interconnect in a direction that is parallel to the "y" axis. If the electrode coating has higher electrical conductivity than the interconnect, the current may take a route that is predominantly through the inactive portion of the electrode coating. If the interconnect has a higher electrical conductivity than the electrode coating, the current may take a route that is predominantly through the interconnect. As shown in FIG. 3C, current that travels in this direction is constant over width W (and accordingly, the current density is constant along W).

Current also travels throughout the length of interconnect 112b to the external circuit. As shown in FIG. 3D, the current increases along the length L of interconnect 112b. Similarly, the current density increases along length L to the connection with the external circuit. As can be seen, the distance that a charge travels over length L is significantly longer than the distance it travels over width W. Since current is accumulated along the length of an interconnect and current travels a relatively longer distance along the length of an interconnect compared to across the width if the unit cell, resistivity in interconnects can be a major source of electrical performance loss. Accordingly, it is desirable that interconnects 112b have high conductivity along their length L.

There are trade-offs to consider when designing interconnects for planar fuel cell layers. On one hand, it may be desirable for an interconnect to have high electrical conductivity, especially along its length. However, many materials that possess high electrical conductivity are either expensive or, under oxidative conditions, produce corrosion products (e.g. copper ions) which are capable of contaminating active components of the fuel cell (e.g. the ion conducting component). Accordingly, it may be desirable for interconnects to possess high electrical conductivity and be designed so that they do not expose active components of the fuel cell to corrosion products.

In some planar fuel cell layers (e.g. planar fuel cell layer 100) the ion conducting components are disposed between the current collectors with their edges in physical contact with the edges of the current collectors. It is desirable for planar fuel cell layers to be resistant to leaks of fuel or oxidant across the fuel cell layer. The current collectors (e.g., interconnects) of the embodiments of the present invention are capable of forming a leak-resistant bond with the materials that form the ion conducting components. For example, the bond may be able to withstand a gas pressure of about 5 psi, or about 15 psi, without leaking a detectable quantity of fluid, such as fuel. In some embodiments, the layer may be substantially impermeable to some fluids, but permeable to others. For example, the layer may be substantially impermeable to a gas pressure imparted by a fuel; however, water may be able to migrate across the ion conducting components.

Some planar fuel cells are designed to power portable consumer applications, such as notebook computers, cellular telephones, personal digital assistants (PDAs), and the like. In such applications, the space available for a fuel cell assembly and system is small. Some planar fuel cells require clamping or compressive force to hold electrical interconnects in contact with the external circuit. Clamps and other means for compression can occupy valuable space in portable consumer devices. Components of fuel cells (e.g. gas diffusion layers, catalyst layers, flow channels) that are clamped must be able to withstand the clamping force without being deformed or crushed. Additionally, the use of clamps and other compression means can constrain the design and assembly methods of the fuel cell assembly. The planar fuel cells of the present embodiments do not require clamping or compressive force in order for them to remain in contact with an external circuit.

FIGS. 4A-4G show truncated sectional views of interconnects within a unit cell, according to several example embodiments. The electrode coatings have been omitted for clarity, and only a portion of ion conducting components 202 have been included in the Figures. Interconnects 210, 220, 230, 240, 250, 260, 260a, 270 each have an electron conducting component 218, 228, 238, 248, 258, 268, 268a, 278 comprising one or more electron conducting regions of one or more types. Interconnects 210, 230, 250, 260, 260a, 270 include one or more first electron conducting regions 212, 232, 252, 262, 262a, 272. Interconnects 210, 220, 230, 240, 250, 260, 260a, 270 include one or more second conducting regions 214, 224, 234, 244, 254, 264, 264a, 274. Interconnects 220, 240, 250, 260, 260a, 270 also include interface regions 226, 246, 256, 266, 266a, 276.

First conducting regions 212, 232, 252, 262, 262a, 272 may include a material that has moderate electrical conductivity and is corrosion resistant. For example, first conducting regions may include carbonaceous materials, such as carbon fibers, carbon needles, amorphous carbon, carbon needles, carbon foams, carbon cloth, the like, or combinations of thereof. First conducting region may, additionally or alternatively, include non-carbonaceous materials such as electrically conductive ceramics, electrically conductive polymers, the like, or combinations of these.

In a fuel cell layer, a first conducting region may provide a moderately conductive pathway from the electrode coating to the second conducting region, if present, or vice versa. In an interconnect that includes a second conducting region, a first conducting region may assist in isolating the active components of the fuel cell from corrosion products. In such an interconnect, the second conducting region may be disposed adjacent to the first conducting region (e.g. FIG. 4A, 4E), or may be disposed between two portions of, or embedded in, the first conducting region (e.g. FIG. 4C, 4F, 4G, 4H). In an interconnect that does not include a second conducting region, a first conducting region may provide a moderately conductive pathway to or from the external circuit.

Second conductive regions 214, 224, 234, 244, 254, 264, 264a, 274 include a material that has very high electrical conductivity (e.g. a material that has an electrical conductivity that is higher than the electrical conductivity of the material(s) in the first conducting region). For example, a second conducting region may include a metal or a metal alloy. In an example embodiment, the second conducting region includes copper, for example, a copper mesh. However, in other embodiments, the second conducting region may include other materials having high electrical conductivity. In a fuel cell layer, a second conducting region may provide a highly conductive pathway along the length (or most of the length) of the interconnect to or from the external circuit.

Interface regions 226, 246, 256, 266, 266a, 276 include one or more materials, which may be electrically non-conductive, ionically non-conductive, or both. For example, interface regions, in their cured or uncured form: may function as a binder; be chemically inert; provide a good surface for bonding with materials of ion conducting components; or, a combination of these. Interface regions may, alternatively or additionally, include a non-conductive material that acts as a filler or strengthener. For example, interface regions may include fiber glass, epoxy, polymers, thermoset polymers, plastic, titanium dioxide, iron oxide, calcium carbonate, the like, or combinations of these.

In a fuel cell layer, interface regions may serve one or more of a number of functions. Interface regions may assist in isolating unit cells by providing a non-conducting surface for an electrode coating to terminate at. An interface region may provide a surface that is capable of forming moderately strong bonds with ion conducting components. Depending on the materials and method used, interface regions may promote adhesion between interconnects and the ion conducting material(s) that form ion conducting components. With an interconnect that includes second electron conducting regions but not first electron conducting regions, interface region may isolate ion conducting components from direct physical contact with second conducting region, thereby reducing the potential for contamination with corrosion products.

FIG. 4A shows an interconnect, according to a first example embodiment. Interconnect 210 has an electron conducting component 218 comprising one first conducting region 212 and one second conducting region 214. In a fuel cell layer, interconnect 210 may provide high electrical conductivity (i.e. via second conducting region 214) while isolating active components of the fuel cell from exposure to corrosion products. Since second conducting region 214 is not in direct physical contact with ion conducting component 202, the potential for corrosion products to leach or migrate directly into ion conducting component 202 may be reduced. The associated electrode coating may be located so that it is not in direct physical contact with second electron conducting region 214 (e.g. it may extend over or under first conducting region 212 and not second conducting region 214). In such an embodiment, the potential for corrosion products to leach or migrate into the ion conducting component indirectly (e.g. via the inactive portion of the electrode coating), over the life of the fuel cell system, may be greatly reduced.

FIG. 4B shows an interconnect, according to a second example embodiment. Interconnect 220 has an electron conducting component 228 comprising one second electron conducting region 224, and an interface region 226. Since second conducting region 224 is not in direct physical contact with ion conducting component 202, the potential for corrosion products to leach directly into conducting component 202 may be reduced. Interface region 226 may provide a surface that promotes adhesion between ion conducting component 202 and interconnect 220.

First conducting regions and/or interface regions may also provide strength or stiffness to interconnects. FIGS. 4C and 4D show interconnects 230 and 240 respectively. Interconnect 230 has one second conducting region 234 sandwiched between two first conducting regions 232. Interconnect 240 has one second conducting region 244 sandwiched between two interface regions 246. The inclusion of a first conducting region 232 or an interface region 246 on either side of second conducting region 234, 244 may provide additional strength or stiffness to interconnect 230, 240.

FIG. 4E shows an interconnect, according to a fifth example embodiment. Interconnect 250 has an electron conducting component 258 comprising one first conducting region 252 and one second conducting region 254. Interconnect 250 also has one interface region 256. In a fuel cell layer, first conducting region 252 may provide a path from the electrode coating to second conducting region 254 or vice versa. First conducting region may enable second conducting region 254 and the electrode coating to be in electrical contact without being in physical contact, thereby reducing the potential for contamination of ion conducting component 202 over the lifetime of the fuel cell system. Second conducting region 254 may provide a highly conductive pathway into or out of the unit fuel cell. Interface region 256 may provide a surface that promotes adhesion between the material(s) of ion conducting component 202 and interconnect 250.

FIGS. 4F and 4G show interconnects, according to sixth and seventh example embodiments, respectively. Interconnects 260 and 270 are each variations on earlier-described embodiments. As can be seen, interconnects 260, 270 each have an electron conducting component 268, 278 comprising one second conducting region 264 sandwiched between two first conducting regions 262. The regions of interconnects 260, 270 may function similarly to the regions of interconnects according to previously-discussed embodiments.

FIG. 4H shows an interconnect, according to an eighth example embodiment. Interconnect 260a is a variation on the embodiment of interconnect 260 illustrated in FIG. 4F, although such a variation may be applied to any of the example embodiments where the second conducting region is sandwiched between two first conducting regions, or between two interface regions. In FIG. 4H, second conducting region 264a is sandwiched between two first conducting regions 262a in an asymmetric fashion. Such an embodiment may allow for the distance between second conducting region and the active regions of the fuel cell to be maximized, with minimal impact on the overall width of interconnect 260a in an embodiment where second conducting region 264a is embedded or sandwiched between two other materials.

As can be seen, interconnects 230, 240, 270 are each symmetrical about their length—e.g. they each have a second conducting region 234, 244, 274 that is sandwiched between two regions or groups of regions that are the same on each side. In a fuel cell system, interconnects 230, 240, 270 may be less likely to bend or warp, since the region(s) on each side of second conducting region 234, 244, 274 would have the same coefficient of thermal expansion.

Some fuel cell systems employ fuel that is a liquid (e.g. methanol in a direct methanol fuel cell system) or that is a humidified gas (e.g. humidified hydrogen in a PEM fuel cell system). In fuel cell systems that do not employ fuels in the form of a liquid or humidified gas (e.g. PEM fuel cell systems that employ non-humidified hydrogen), water produced at the cathode may pool in the fuel plenum. In any such fuel cell systems where water or a liquid is present, the use of an interconnect including a metal may lead to contamination of the ion conducting components, through leaching of corrosion products into the ion conducting component.

Figure 5:
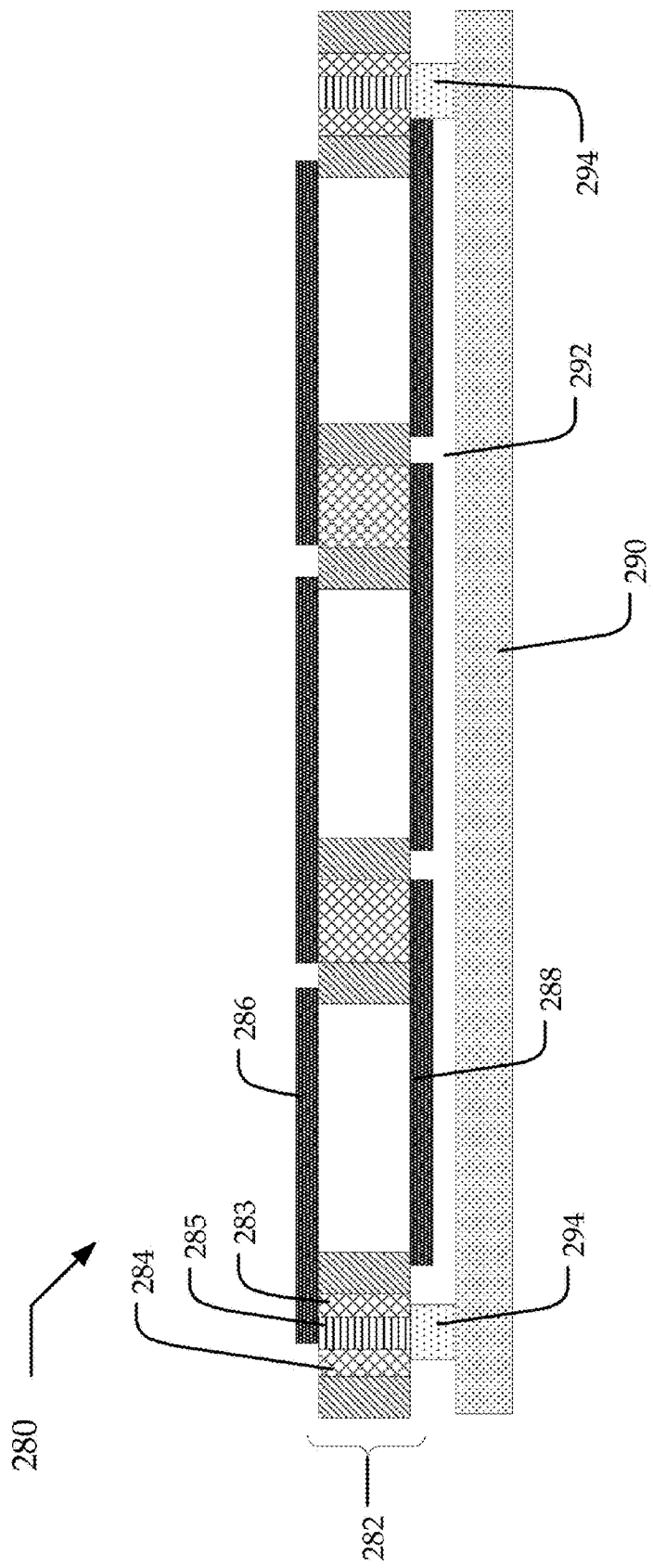
FIG. 5 is a sectional view of a fuel cell system employing the interconnect of FIG. 4G, according to an example embodiment.

FIG. 5 is a cross-sectional view of a fuel cell system 280, illustrating interconnects (end current collectors) shown in FIG. 4G, according to an example embodiment. Fuel cell system 280 has a fuel cell layer 282 having a composite layer including interconnects 284, cathode coatings 286 and anode coatings 288. Interconnects 284 have first conducting regions 283 including a non-corrosive electrically conductive material and second conducting regions 285 comprising an electrically conductive material which may be susceptible to corrosion, such as a metal. In some embodiments, second conducting regions 285 may have a higher electrical conductivity than first conducting regions 283. In some other embodiments, second conducting regions 285 and/or first conducting regions 283 may have anisotropic conductivity, and may be more electrically conductive in one direction than others; for example, first conductive regions 283 may be more electrically conductive across their width (e.g. across the page, as illustrated in FIG. 5), while second conductive regions 285 may be more electrically conductive along their length (e.g. into the page, as illustrated in FIG. 5). In the illustrated embodiment, fuel cell system 280 includes a fuel distribution manifold 290 coupled with fuel cell layer 282, defining a fuel plenum 292. In the embodiment shown, fuel distribution manifold 290 is attached to fuel cell layer 282 via spacer 294. However, in alternative embodiments, the fuel distribution manifold 290 may be coupled directly to the fuel cell layer 282, or may be indirectly coupled to the fuel cell layer 282 using, for example, a flow field or porous layer (not shown) disposed between the fuel cell layer 282 and the fuel manifold 290. Additional support structures may be disposed between the fuel manifold 290 and the fuel cell layer 282, such as those described in commonly-owned U.S. Patent Application Publication No. 2009/0081493, titled FUEL CELL SYSTEMS INCLUDING SPACE-SAVING FLUID PLENUM AND RELATED METHODS, the disclosure of which is herein incorporated by reference in its entirety.

In the illustrated embodiment, spacer 294 is disposed so that it covers the surface of second electron conducting region 285. Although there is an electrical pathway that extends from a cathode coating 286 to first conducting region 285 (via either first conducting region 283 or the inactive portion of the cathode coating 286), the fuel does not come into contact with first conducting region 285 (neither directly nor indirectly via cathode coating 286). Accordingly, interconnect 284 provides a highly conductive pathway into and out of fuel cell layer 282 but does not expose the active components of the fuel cell layer 282 to materials which could yield corrosion products during fuel cell operation.

Figure 6A:
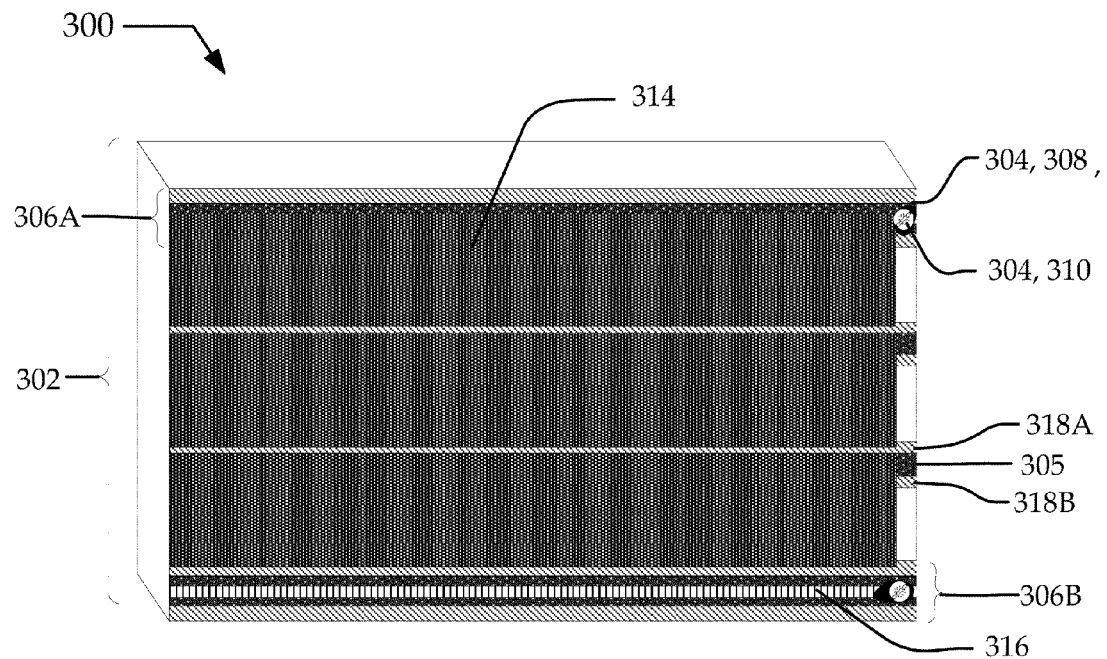
FIGS. 6A and 6B are top perspective views of partial fuel cell systems employing interconnects, according to example embodiments.
Figure 6B:
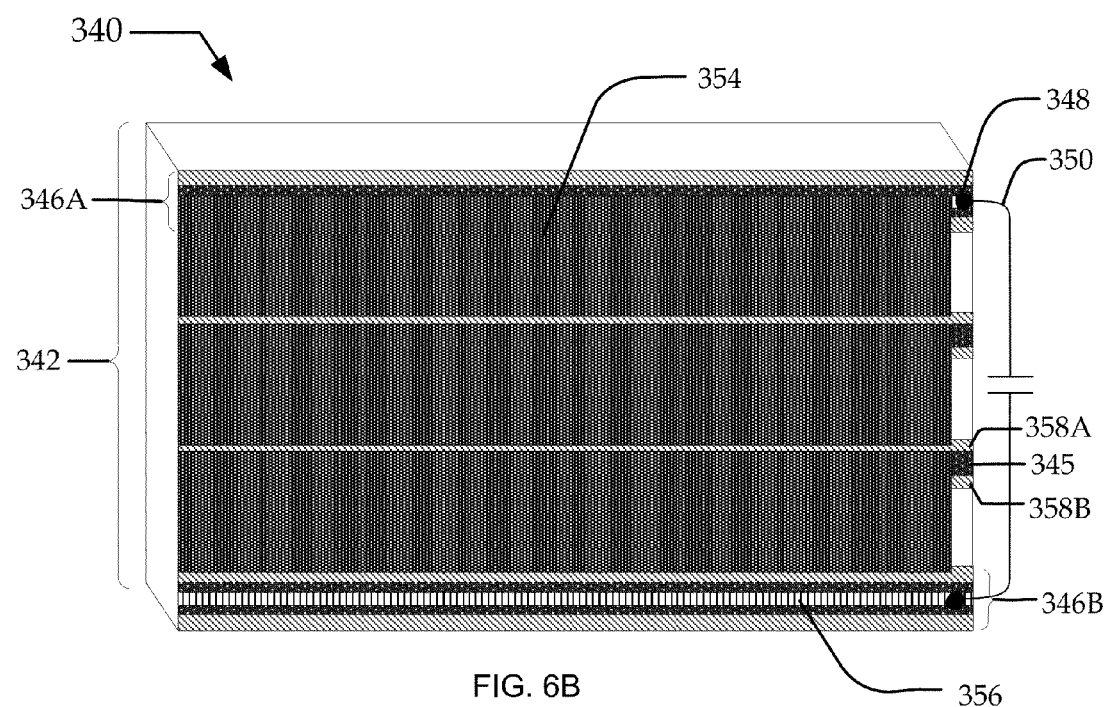

When employed in a fuel cell system, interconnects according to embodiments may simplify connection to an external circuit. FIGS. 6A and 6B are top perspective views of fuel cell layers 302, 342 employing interconnects 306, 346 of FIG. 4G, according to example embodiments. Partial fuel cell system 300, 340 includes a fuel cell layer 302, 342. Fuel cell system 300 also includes connection components 304. The fuel manifold assembly is omitted for clarity. Fuel cell layer 302, 342 has cathode coatings 314, 354 and anode coatings (not shown) disposed on a composite layer comprising inner current collectors 305, 345 and interconnects 306, 346. In the embodiments shown, interconnects 306a, 346a are partially covered by cathode coating 314, 354, while interconnects 306b, 346b are illustrated fully exposed (and would be in contact with the anode coatings of the fuel cell layer 302, 342, not shown). In the embodiment shown, interconnects 306a, 306b, 346a, 346b have a second conducting region 316, 356 that includes a metal. Fuel cell layer 302, 342 further include interface regions 318a, 318b, 358a, 358b, which are disposed on either side of inner current collectors 305, 345 to provide a region of electrical discontinuity between adjacent unit fuel cells.

Employing interconnects 306a, 306b, 346a, 346b with first conducting region 316, 356, one is able to use soldering as a method of connecting fuel cell layer 300, 340 with an external circuit. Referring to FIG. 6A, in fuel cell system 300, solder pads 308 are created and are in contact with second conducting region 316 of interconnects 306a, 306b. Solder pads 308 may provide a larger surface for contact with protuberance 310. In the embodiment shown, protuberance 310 is a screw. However, other protuberances may be used, such as pins (e.g. spring pins), knobs, studs or the like. Protuberances 310 may be connected to an external circuit through a variety of means. In an example embodiment, protuberances 310 are in contact with a circuit board.

An external circuit may also be connected directly to the interconnects. Referring to FIG. 6B, in fuel cell system 340, the wires of external circuit 350 may be soldered directly onto interconnects 346a, 346b at points 348a, 348b, respectively. Thus, a fuel cell system employing interconnects according to some embodiments may not require clamps or compressive force in order to remain in contact with an external circuit. Fuel cell systems according to such embodiments may require less space in a device, for example, a portable consumer application.

In other embodiments, the interconnect itself may provide a convenient tab or surface for connection with the external circuit. For example, a screw, pin (e.g. a spring-pin) or other protuberance may be placed directly in contact with an interconnect, without the need for a solder pad. In other embodiments, interconnects may be placed in contact with the terminals of an edge-card connector by plugging the fuel cell layer into the card-edge connector.

Described above are interconnects, according to one or more embodiments of the invention, employed in the example planar fuel cell of FIG. 2A. However, interconnects may be applied to other example planar fuel cells. For example, interconnects may be applied to many other embodiments of edge-collected fuel cells, such as those disclosed in U.S. Pat. No. 5,989,741 entitled ELECTROCHEMICAL CELL SYSTEM WITH SIDE-BY-SIDE ARRANGEMENT OF CELLS and U.S. patent application Ser. No. 12/153,764 entitled SIDE-BY-SIDE FUEL CELLS and published as U.S. Patent Application Publication No. US 2008/0299435.

Figure 7:
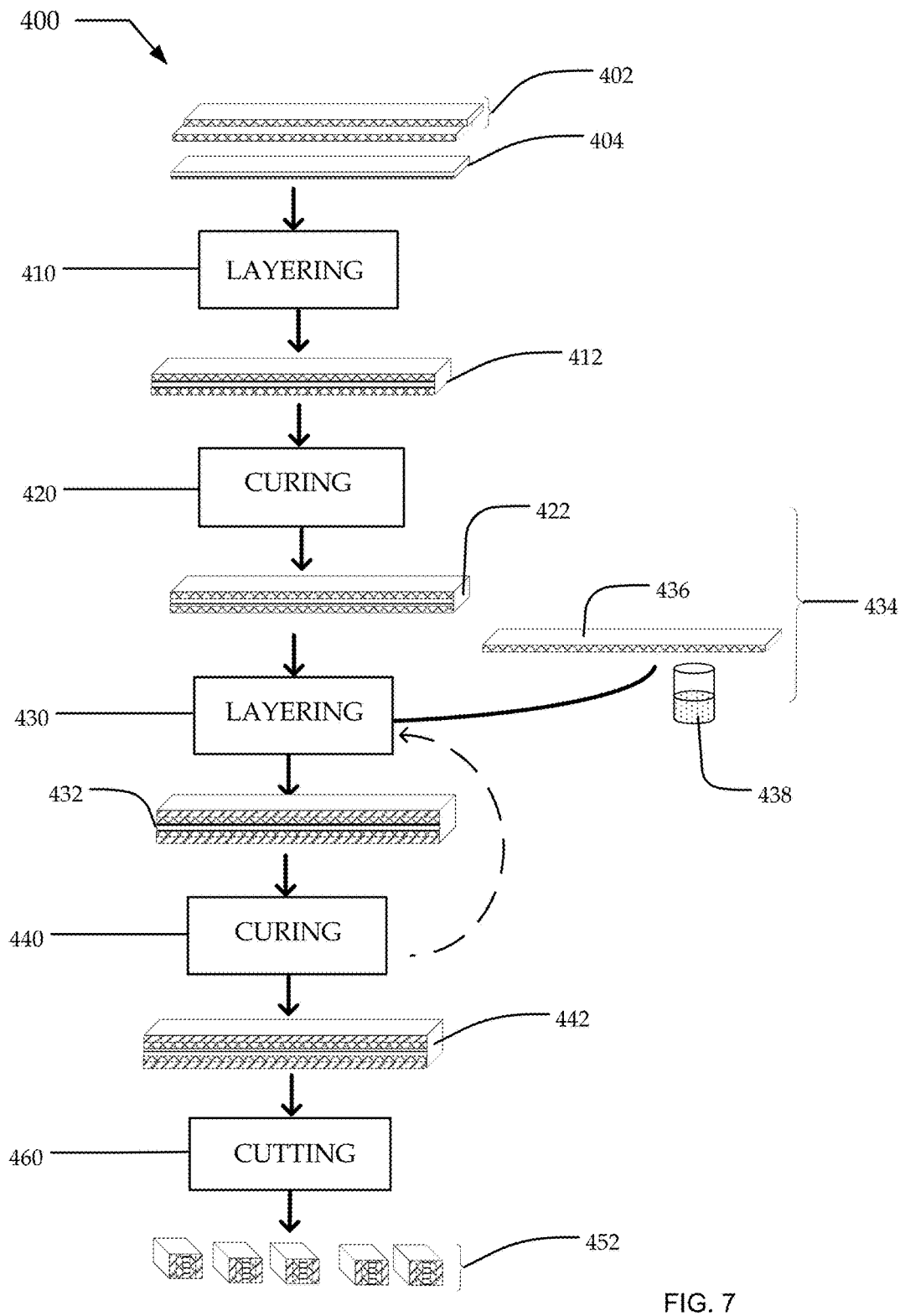
FIG. 7 is a block process diagram of one possible method of preparing interconnects, such as the interconnects illustrated in of FIG. 4E-4G.

FIG. 7 is a block process diagram of one possible method of preparing interconnects, such as the interconnects shown in FIGS. 4E-4H, according to an example embodiment. In method 400, first electrically conductive material 402 and second electrically conductive material 404 are subjected to a first layering stage 410 to yield a "layered structure" 412. Layered structure 412 is subjected to a curing stage 420 to yield a preform 422. Preform 422 may optionally be subjected to a second layering stage 430 to yield a coated preform 432 and optionally, coated preform 432 is subjected to a second curing stage 440 to yield an interconnect sheet 442. Interconnect sheet 442 is subjected to a cutting stage 450 to yield interconnects 452.

Electrically conductive materials 402, 404 are subjected to a layering stage 410 to yield a "layered structure" 412. Layering stage 410 may include layering one or more first electrically conductive materials 402 with one or more second electrically conductive materials 404 to form layered structure 412. First electrically conductive materials 402 may include one or more materials that have moderate electrical conductivity and are corrosion resistant. For example, first electrically conductive materials may include carbonaceous materials, such as graphite, expanded graphite, carbon fibers, carbon needles, amorphous carbon, carbon foams, the like, or combinations of these. In an example embodiment, first electrically conductive materials 402 may include carbon fibers, such as woven carbon fibers. First electrically conductive materials may also include a non-conductive material, for example, a non-conductive material that is capable of binding materials together or that is curable, such as a thermoset polymer. In an example embodiment, first electrically conductive materials 402 may include an epoxy resin. In a further example embodiment, first electrically conductive materials 402 may include carbon fibers and epoxy resin in the form of a pre-impregnated woven carbon fiber.

Second electrically conductive materials 404 may include one or more materials that have very high electrical conductivity (i.e. one or more materials that have an electrical conductivity that is higher than the electrical conductivity of first electrically conductive materials 402). For example, second electrically conductive materials 404 may include a metal or a metal alloy. In an example embodiment, second electrically conductive materials 404 may include copper or a copper mesh. Second electrically conductive materials 404 may additionally include a non-conductive material, such as a polymer or a polymer mixture. Second electrically conductive material 404 may include a non-conductive material that is capable of binding materials together or that is curable. In an example embodiment, second electrically conductive materials 404 may include a polymer mixture that includes a resin, such as an epoxy resin, or any thermoset or thermoplastic polymer, or any other polymer or composite possessing suitable properties.

Layered structure 412 may be subjected to a curing stage 420 to yield a preform 422. Curing stage 420 may include subjecting layered structure 412 to a temperature, a pressure, or both for a period of time. Layered structure 412 may be subjected to a pressure, for example, that is sufficient to yield a preform 422 of a desired thickness or flatness.

Preform 422 may optionally be subjected to a second layering stage 430 to yield a coated preform 432. Second layering stage 430 may include layering interface materials 434 with preform 422. Interface region materials 434 may include one or more materials that are non-conductive and are chemically inert (or are capable of being rendered chemically inert). In an example embodiment, interface materials 434 may include a filler 436 and a curable polymer mixture 438. Filler 336 may include a non-conductive material that functions to increase the width of the resulting interface region or provide strength or structural support, for example, glass fibers (e.g. woven glass fibers or non-woven glass fibers), plastic (e.g. plastic sheet, plastic particles, woven plastic strands, or porous plastic) titanium dioxide, iron oxide, silicon dioxide, calcium carbonate, the like, or combinations of these. Curable polymer mixture 438 may include a material or materials that are chemically inert, electrically insulating or provide a good surface for bonding with ion conducting materials. In an example embodiment, curable polymer mixture 438 may include a non-conductive material that acts as binder and is capable of being cured. In some embodiments, curing may be accelerated or activated in the presence of heat, such as a thermoset polymer. Curable polymer mixture may be curable without the addition of heat. Curable polymer mixture may include materials such as a resin, a hardener, a flexiblizer, a catalyst or an accelerant. However, the interface materials of other embodiments may include only one of these materials or none of these materials.

Second layering stage 430 may include layering interface materials 434 with preform 422 by disposing filler 436 on preform 422 and then applying curable polymer mixture 438. Optionally, second layering stage may include activating the surface of cured preform 422 prior to disposing filler 436. Activation may improve the adhesion between the surface of cured preform 422 and interface materials 434.

Coated preform 432 if present, may be subjected to a second curing stage 440 to yield an interconnect sheet 442. Second curing stage 440 may include subjecting coated preform 432 to a temperature and a pressure for a period of time. For example, coated preform 432 may be heated at a temperature that is above the temperature at which curable polymer mixture cures but is below the temperature at which it decomposes. Coated preform 432 may be subjected to a pressure, for example, a pressure that that is sufficient to yield an interface sheet 442 of a desired thickness or flatness. Optionally, second layering stage 430 and second curing stage 440 may be repeated when preparing the interconnects of FIG. 4G.

Interconnect sheet 442 may be subjected to a cutting stage 460 to yield interconnects 452. In cutting stage 460, interface sheet 442 (or preform 422) may cut to form individual current collectors 452.

Method 400 may be varied to prepare interconnects according to other embodiments. For example, the first electron conducting region may be omitted to yield interconnects as shown in FIGS. 4B and 4D.

Orientation of Conductive Fibers

Various embodiments of the present invention provide a fuel cell connection component that includes conductive fibers. Conductive fibers of any suitable composition can be present in any suitable part of the fuel cell connection component, including either or both of a first and second electron conducting region. Any suitable number, orientation, type, or spacing of conductive fibers can be used in the fuel cell connection components of the present invention. For example, the conductive fibers can be bundles. The bundles can include fibers that are twisted, untwisted, woven, or in any other suitable arrangement. The conductive fibers can be separate non-bundled fibers. Similarly aligned fibers or bundles of fibers can be spaced such that they are touching, or pressed together. In another embodiment, similarly aligned fibers or bundles of fibers can have any suitable amount or pattern of spacing between the fibers or bundles. For example, similarly aligned fibers or bundles can be spaced apart by about 0.0001 mm, 0.001 mm, 0.01 mm, 0.1 mm, 1 mm, or by about 10 mm.

Especially when multiple fuel cells are used, such as in a stack or planar fuel cell system, electrical resistance from components can accumulate to create a comparatively large internal resistance within the array. A large internal resistance can decrease performance of a fuel cell system, including a fuel cell system with multiple cells, including a stack or planar fuel cell system. There is a need for fuel cell connection components that are highly conductive, that are strong and durable, and that are simple and inexpensive to produce.

Various embodiments of the present invention provide a fuel cell connection component, including an interconnect or a current collector. The fuel cell connection component includes conductive fibers oriented at an angle of less than about 90° to at least one electrode in the fuel cell. The fuel cell connection component provides an electrically conductive pathway from the at least one electrode of the fuel cell to an external circuit or to an electrode of a different fuel cell. Embodiments of the present invention also provide fuel cells that include the fuel cell connection components, including fuel cell layers, and methods of making the same.

One of skill in the art would generally assume that the highest conductivity in a fuel cell connection component using conductive fibers could be achieved by forming the shortest and most direct conductive path in that component. In a fuel cell conducting component, this can involve arranging a first set of conductive fibers such that they form a right angle with the electrode. However, for example, in some embodiments of the present invention it has been found that by orienting the conductive fibers such that they form an angle of less than about 90° with the electrode or electrode coating, such as for example 45°, conductivity of the fuel cell connection component is higher than that of a fuel cell connection component with the conductive fibers oriented at about 90° to the electrode or electrode coating.

Further, for one of skill in the art to arrange conductive fibers in a fuel cell connecting component to achieve the shortest path, this can involve arranging a second set of conductive fibers such that they form an approximate right angle with the first set of conductive fibers (e.g. the first and second set of conductive fibers form a grid), such that the second set of conductive fibers are parallel to the length of the fuel cell conducting component. This is especially the case for interconnects, wherein current can travel along the length of the interconnect to an external circuit. Such an arrangement can provide an orientation of fibers wherein the fibers are parallel to the plane of conduction of electrons. However, in another example, surprisingly and unexpectedly, by including a first set of conductive fibers and a second set of conductive fibers in the fuel cell connection component, both of which form an angle of less than about 90° with the electrode or electrode coating, such as for example 45°, and each of which forms an approximately 90° angle with each other (e.g. the first and second set of conductive fibers form a grid), conductivity of the fuel cell connection component is higher than that of a fuel cell conducting component that includes a first and second set of conductive fibers, one of which forms an approximately 90° angle with the electrode or electrode coating, and each of which forms an approximately 90° angle with one another.

Without being bound to any particular theory of operation, by orienting the conductive fibers such that they form an angle of less than about 90° with the electrode or electrode coating, such as for example 45°, some embodiments of the fuel cell connection component of the present invention can exhibit higher conductivity due to a higher exposed surface area of carbon fibers at the interface with the electrode, e.g. higher interfacial area. In another example, the angle of less than about 90° can allow for the surface area of each fiber or bundle of fibers at the electrode interface to be greater than if the fiber or bundle of fibers were oriented at approximately 90° with respect to the electrode or electrode coating; this can be analogous to the cross section of a cylinder having greater surface area when taken at non-90° angles to the height of the cylinder. In one example, independently of higher area per fiber or per bundle, the angle of less than 90° can allow more room for the fiber or bundles of fibers that occur at the electrode interface. Even though in some embodiments the non-90° angle of the conductive fibers can cause increased resistivity within the fuel cell connection component, the increase in surface area can more than offset this loss, and overall the fuel cell connection component can have greater conductivity within the fuel cell.

In a fuel cell conducting component that includes a first and second set of conductive fibers, the first of which forms an approximately 90° angle with the electrode or electrode coating, and each of which forms an approximately 90° angle with one another, the second set of fibers allows for a direct path for conduction along the length of the component, and the first set of fibers allows for a direct path from electrode-to-electrode; however, within the second set of fibers current must hop from fiber to fiber to move from electrode-to-electrode, and within the first set of fibers current must hop from fiber to fiber to move parallel to the length of the component, and within both sets of fibers, current must hop from the first set of fibers to the second set of fibers to move from an electrode to a direction parallel to the length of the component, any of which can cause conductive losses. In contrast, in embodiments that contain a first set of conductive fibers and a second set of conductive fibers in the fuel cell connection component, both of which form an angle of less than about 90° with the electrode or electrode coating, such as for example 45°, and each of which forms an approximately 90° angle with each other (e.g. the first and second set of conductive fibers form a grid), both sets of fibers can provide conduction pathways both along the length of the component and from electrode to electrode along individual fibers with less hopping between fibers. Even though the orientation of fibers at this angle can mean the total fiber length along which conduction takes place is longer for both electrode-to-electrode conduction and for conduction parallel to the length of the fuel cell connection component, a greater overall cross-sectional area of conductive fibers is available for conduction in both the electrode-to-electrode direction and in a direction parallel to the length of the component, which along with increased interfacial area can help to offset any conductive losses caused by increased conductive path-length. Some embodiments can optionally also include fibers running approximately parallel to the length of the fuel cell connecting component. Some embodiments do not include fibers running approximately parallel to the length of the fuel cell connecting component.

Without being bound to any particular theory of operation, by orienting the conductive fibers such that they form an angle of less than about 90° with the electrode or electrode coating, such as for example 45°, some embodiments of the fuel cell connection component of the present invention can be more strong and durable, and can have conductive fibers that are more resistant to being pulled-out, due to a greater length of the conductive fibers within the fuel cell connection component, as compared to the length of conductive fibers that form an approximately 90° angle with the electrode or electrode coating. A greater length of conductive fibers within the fuel cell connection component translates to a greater surface area of conductive fibers being present within the fuel cell connection component, which means that a larger surface area of each conductive fiber is in contact with the binder. By increasing the surface area of fibers in contact with the binder, some embodiments can have greater binding with the fibers. Greater binding with the fibers can result in increased pull-out resistance for the fibers. Additionally, greater binding with the fibers can result in greater strength or durability of the fuel cell connection component. In some embodiments, the greater binding with the fibers can help to convert a fiber-pulling force which has a predominantly tensile component into a force within the fuel cell connection component that has both a tensile and a shear component, thus distributing the force through a greater area of the fuel cell connection component. In some embodiments, varying the angle the conductive fibers form with the electrode or electrode coating can vary the degree to which a tensile fiber-pulling force can be broken into tensile and shear force components within the fuel cell connection component. In embodiments that include a second set of fibers having an approximately 90° angle with the first set of fibers, both sets of fibers can have greater surface area in contact with the binder due to a less than 90° angle formed with the electrode or electrode coating. In embodiments that do not have fibers running parallel to the length of the fuel cell connecting component, any loss of strength caused by a lack of fibers running parallel to the length of the fuel cell connecting component can be more than offset by the increase in strength caused by the increased surface area of the fibers that form a less than 90° angle with the electrode or electrode coating. Other embodiments also have conductive fibers running approximately parallel to the length of the component, in addition to the fibers forming less than a 90° angle with the electrode or electrode coating.

In another example, some embodiments the present invention can be made using less compressive force than other fuel cell connection components. In some embodiments, the use of a large amount of compressive force during manufacture can help to ensure adequately high density of the conductive fibers at the electrode interface. Additionally, in some embodiments, the use of a large amount of compressive force during manufacture can help to ensure a low resistance for current pathways that include hopping from fiber to fiber. However, for embodiments that include conductive fibers oriented at less than 90° with respect to the electrode or electrode coating, and that include higher interfacial surface area, the use of high compressive forces to achieve higher densities of conductive fibers at the interface can be less critical. In some embodiments, the utility of using high compressive forces during manufacture can be offset by the higher interfacial surface area due to the orientation of the fibers, or offset by other advantages, including less fiber-to-fiber hopping for conduction in particular directions, or including greater overall cross-sectional conductive area. Some embodiments that include conductive fibers oriented at less than 90° with respect to the electrode or electrode coating can be made using the same or greater amount of compressive force as other fuel cell connection components.

Some embodiments of the fuel cell connection component that include conductive fibers oriented at less than 90° with respect to the electrode or electrode coating can have the advantages discussed herein, including higher conductivity, more secure binding of conductive fibers, greater strength, greater durability, or less compressive force needed during manufacture, without an increase in complexity, price, changes in materials, or other substantial changes in manufacturing processes. Modification of the orientation of the conductive fibers, or addition of conductive fibers that have a different fiber orientation, can be a relatively simple manufacturing protocol which in some embodiments can be implemented with a minimal increase in manufacturing complexity or cost.

In various embodiments, the present invention provides a fuel cell connection component. The fuel cell connection component includes a non-conductive interface region. The non-conductive interface region has a first surface and a second surface. The fuel cell connection component also includes an electron conducting component. The electron conducting component has two surfaces and a length that is parallel to the two surfaces of the electron conducting component. One of the surfaces of the electron conducting component is disposed adjacent to the second surface of the interface region. The electron conducting component includes conductive fibers. The conductive fibers are oriented approximately parallel to the two surfaces of the electron conducting component. The conductive fibers are adapted to be oriented at an angle of less than about 90° to at least one electrode in a fuel cell. The fuel cell connection component also includes a binder. The binder holds the interface region and the electron conducting component together. The fuel cell connection component is adapted for use in the fuel cell such that it provides an electrically conductive path between the at least one electrode of the fuel cell and an external circuit or between the at least one electrode of the fuel cell and at least one electrode of a different fuel cell.

In some embodiments, the conductive fibers that are adapted to be oriented at an angle of less than about 90° to at least one electrode in a fuel cell can include conductive fibers adapted to be oriented at less than an angle of about 80°, 70°, 60°, or less than about 50° to the at least one electrode in the fuel cell. In some embodiments, the conductive fibers that are adapted to be oriented at an angle of less than about 90° to at least one electrode in a fuel cell can include conductive fibers adapted to be oriented at an angle of more than about 0°, 10°, 20°, 30° or 40° to the at least one electrode in the fuel cell. In some embodiments, the conductive fibers that are adapted to be oriented at an angle of less than about 90° to at least one electrode in a fuel cell can include conductive fibers adapted to be oriented at about 45° to the at least one electrode, or at about 40° to about 50° to the at least one electrode, or at about 35° to about 55° to the at least one electrode, or at about 30° to about 60° to the at least one electrode, or about 22° to about 68° to the at least one electrode. The fuel cell connection component can include other conductive fibers aside from the conductive fibers that are adapted to be oriented at an angle of less than about 90° to the at least one electrode, for example conductive fibers that are adapted to be oriented at angles of about 90° to the at least one electrode, or conductive fibers that are adapted to be oriented at angles of about 0° to the at least one electrode.

In some embodiments, the fuel cell connection component can include at least a first set of conductive fibers and a second set of conductive fibers. Both the first and second set of conductive fibers can be adapted to be oriented at an angle of less than about 90° to the at least one electrode in the fuel cell. The first set of conductive fibers and the second set of conductive fibers can be oriented such that the first set of conductive fibers forms an angle of between approximately 45° and about 135° with the second set of conductive fibers. In some embodiments, the first set of conductive fibers and the second set of conductive fibers can be oriented such that the first set of conductive fibers forms an angle of between approximately 50° and about 130°, between about 60° and about 120°, between about 70° and about 110°, between about 80° and about 100°, between about 85° and about 95°, or of about 90° with the second set of conductive fibers. In some embodiments, the first and second set of fibers form a grid, wherein the fibers of the grid form an approximately 45° angle with the at least one electrode of the fuel cell. In some embodiments, the conductive fibers can include carbon fibers. In some embodiments, the conductive fibers can include metal fibers, for example including copper fibers, such as a copper metal fiber, or such as a composite fiber that includes copper metal and carbon fibers.

In some embodiments, the fuel cell connection component can include an interface region that can include glass fibers, and an electron conducting component that can include conductive fibers, and a binder. In some embodiments, the conductive fibers can include fibers such as carbon fibers or such as fibers including a conductive metal. In some embodiments, the conductive fibers can include conductive metal fibers, such as copper metal fibers, or such as a composite fiber that includes metal, such as a composite fiber including copper and carbon fibers. In some embodiments, the electron conducting component can include both carbon fibers and fibers that include a conductive metal, such as copper metal fibers, or such as a composite fiber including copper metal and carbon fiber. In some embodiments, the electron conducting component can include carbon fibers adjacent to the interface region, and fibers including conductive metal or a composite thereof adjacent to the carbon fiber region. Either one or both of the carbon and metal or composite fibers can include fibers oriented at less than about 90° to the at least one electrode of the fuel cell, for example, 45°. Either one or both of the carbon fibers and the fibers including a conductive metal can include a first and second set of conductive fibers, each of which is oriented at less than about 90° to the at least one electrode of the fuel cell, for example, 45°, and wherein the first and second set of conductive fibers forms an angle of between approximately 45° and about 135° with each other, for example 90°. In one example, for either one or both of the carbon fibers and the fibers including a conductive metal, the first and second set of fibers form a grid, wherein the fibers of the grid form an approximately 45° angle with the at least one electrode of the fuel cell.

In some embodiments, the fuel cell connection component is an interconnect. In some embodiments, the fuel cell connection component is a current collector. In some embodiments, the fuel call connection component is both a current collector and an interconnect.

The present invention provides a fuel cell. The fuel cell includes an ion conducting component. The fuel cell also includes two or more electrode coatings. The fuel cell also includes one or more fuel cell connection components. The fuel cell connection components include a non-conductive interface region. The non-conductive interface region has a first surface and a second surface. The first surface of the non-conductive interface region is in contact with the ion conducting component. The fuel cell connection components also include an electron conducting component. The electron conducting component has two surfaces and a length that is parallel to the two surfaces of the electron conducting component. One of the surfaces of the electron conducting component is disposed adjacent to the second surface of the interface region. The electron conducting component includes conductive fibers. The conductive fibers are oriented approximately parallel to the two surfaces of the electron conducting component. The conductive fibers are oriented at an angle of less than about 90° to one of the electrode coatings. The electron conducting component provides an electrically conductive pathway between the one electrode coating and an external circuit or between the one electrode coating and an electrode coating of another fuel cell. The pathway extends along the length of the electron conducting component. The fuel cell can include any fuel cell connection component described herein.

The present invention provides a fuel cell layer. The fuel cell layer includes a composite layer. The composite layer includes a first surface and a second surface. The composite layer includes a plurality of fuel cell connection components. The composite layer includes a plurality of ion conducting components. The ion conducting components are positioned between the fuel cell connection components. The composite layer also includes a first plurality of electrode coatings. The first plurality of electrode coatings are disposed on the first surface to form anodes. The composite layer also includes a second plurality of electrode coatings. The second plurality of electrode coatings is disposed on the second surface to form cathodes. Each of the first and second plurality of electrode coating is in ionic contact with one of the ion conducting components and in electrical contact with one of the fuel cell connection components. At least one of the fuel cell connection components includes an interface region. The interface region has a first surface and a second surface. The first surface is in contact with one of the ion conducting components. The at least one fuel cell connection component also includes at least one electron conducting component. The at least one electron conducting component has two surfaces and a length parallel to the two surfaces. One of the surfaces of the at least one electron conducting component is disposed adjacent to the second surface of the interface region. The at least one electron conducting component includes conductive fibers. The conductive fibers are oriented approximately parallel to the two surfaces of the at least one electron conducting component. The conductive fibers are oriented at an angle of less than about 90° to at least one of the first or second plurality of electrode coatings. At least one of the fuel cell connection components provides an electrically conductive pathways between the at least one of the first or second plurality of electrode coatings and an external circuit or between one of the first or second plurality of electrode coatings and a different one of the first or second plurality of electrode coatings. The pathway extends along the length of the at least one electron conducting component. The fuel cell layer can include any fuel cell connection component or any fuel cell described herein.

Figure 8A:
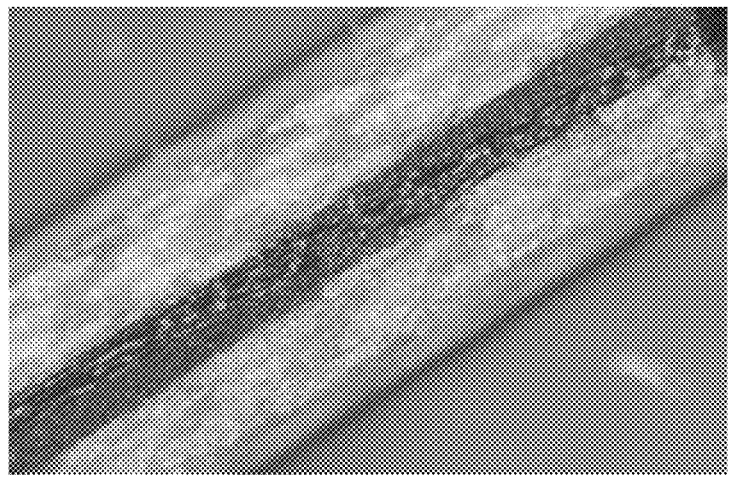
FIG. 8A is a top view of fuel cell connection component, in accordance with various embodiments.

FIG. 8A is a top view of fuel cell connection component, in accordance with various embodiments. FIG. 8A shows a photograph of a top view of a current collector with 90° fiber orientation, taken through a low power (<200 magnification) microscope. FIG. 8A shows a fuel cell connection component that includes a first set and a second set of conductive fibers, the first set of fibers being adapted to be aligned at approximately a 90° angle with an electrode or an electrode coating, the second set of fibers being oriented approximately parallel with the length of the fuel cell connection component, wherein the first and second set of fiber form an approximately 90° angle with one another. Regions of different fiber orientation can be seen, with a relatively low proportion of cut fibers being exposed to the surface that will eventually be covered with the electrode coating. In FIG. 8A, it can be seen that one set of fibers bundles has exposed ends and the other set of fiber bundles is lying in the plane of the Figure.

Figure 8B:
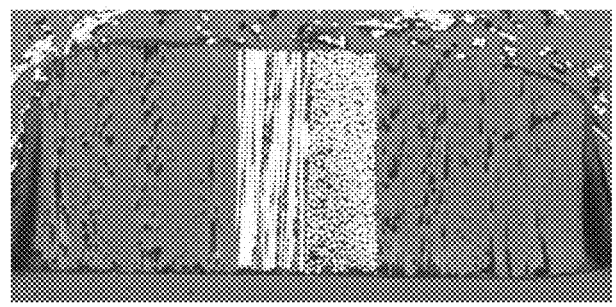
FIG. 8B is a side view of a fuel cell connection component, in accordance with various embodiments.

FIG. 8B is a side view of a fuel cell connection component, in accordance with various embodiments. FIG. 8B shows a fuel cell connection component that includes a first set and a second set of conductive fibers, the first set of fibers being adapted to be aligned at approximately a 90° angle with an electrode or an electrode coating, the second set of fibers being oriented approximately parallel with the length of the fuel cell connection component, wherein the first and second set of fiber form an approximately 90° angle with one another. FIG. 8B is a photograph of a current collector that has been cross-sectioned to expose the fiber bundles. In FIG. 8B, it can be seen that one set of fibers has the shortest possible conductive path from the top to the bottom surface (visible as vertical cross-sections of fibers), whereas the second set of fibers do not form a conductive path from the top to the bottom surface (visible as the ends of fibers running parallel to the length of the component); thus, fiber to fiber hopping must occur for current to move through the plane, and fiber to fiber hopping must occur between the second set of fibers for current to move from the top surface to the bottom surface within the second set of fibers.

Figure 9A:
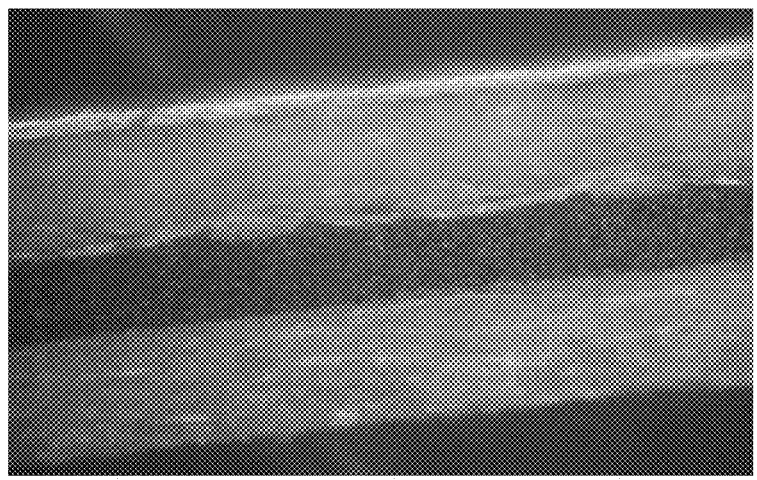
FIG. 9A is top view of a fuel cell connection component, in accordance with various embodiments.

FIG. 9 shows photographs of low power (<200 magnification) microscope views of a current collector with a 45° fiber orientation. FIG. 9A is top view of a fuel cell connection component, in accordance with various embodiments. FIG. 9A shows a fuel cell connection component that includes a first set and a second set of conductive fibers, the first and second set of fibers being adapted to be oriented at approximately 45° to the electrode or electrode coating of the fuel cell, and the first and second set of fibers forming an approximately 90° angle with one another. In FIG. 9A, it can be seen that since both the first and second set of fibers can contact the electrode and forms an approximately 45° angle therewith, approximately double the number of fibers contacts the top surface, as compared to the embodiment shown in FIG. 8A.

Figure 9B:
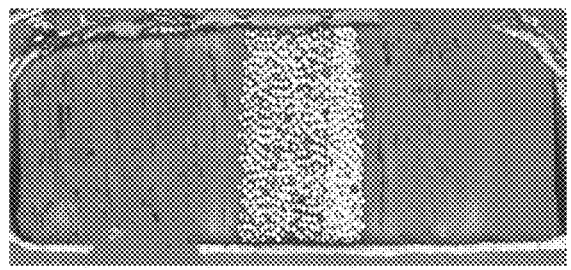
FIG. 9B is a side view of a fuel cell connection component, in accordance with various embodiments.

FIG. 9B is a side view of a fuel cell connection component, in accordance with various embodiments. FIG. 9B shows a fuel cell connection component that includes a first set and a second set of conductive fibers, the first and second set of fibers being adapted to be oriented at approximately 45° to the electrode or electrode coating of the fuel cell, and the first and second set of fibers forming an approximately 90° angle with one another. In FIG. 9B, it can be seen that no fibers form an approximately 90° angle with the electrode (which would appear as vertical cross-sections of fibers running top to bottom), and rather all fibers form an approximately 45° angle with the electrode (visible as ends of fibers).

EXAMPLES

The present invention can be better understood by reference to the following examples which are offered by way of illustration. The present invention is not limited to the examples given herein.

Example 1

Voltage Drop Testing of Fuel Cell Connection Components with Various Orientations of Conductive Fibers Several fuel cell connection components were prepared with various orientations of conductive fibers. The fuel cell connection components each included a grid of conductive fibers between two layers of glass fibers, bound together by an epoxy resin. The fuel cell connection components included two fuel cell connection components with 8 bundles of carbon fibers in a "standard" configuration ("8× Standard CC," 4 adapted to be at approximately 90° to the electrode or electrode coating, and 4 running approximately parallel to the length of the fuel cell connection component), two fuel cell connection components with 8 bundles of carbon fibers in a 45° configuration ("8×45° CC," all 8 adapted to be at approximately 45° to the electrode or electrode coating, with 4 forming an approximately 90° with the other four), one fuel cell connection component with 12 bundles of carbon fibers in a "standard" configuration ("12× Standard CC," 6 adapted to be at approximately 90° to the electrode or electrode coating, and 6 running approximately parallel to the length of the fuel cell connection component), and one fuel cell connection component with 12 bundles of carbon fibers in a 45° configuration ("12×45° CC," all 12 adapted to be at approximately 45° to the electrode or electrode coating, with 6 forming an approximately 90° with the other 6). The resistance of each fuel cell connection component was measured by compressing the fuel cell connection component between two electrodes using approximately 10 psi pressure, passing a known current through the component, and measuring the voltage drop using a DC resistance analyzer. A greater voltage drop corresponds to a higher resistance. Next, the voltage drop of each fuel cell connection component was measured in the same fashion, but using a Grafoil™ pad (5 mil, made from graphite flake) on top. Since the Grafoil™ pad generally has less contact resistance with the fuel cell connection component regardless of the interfacial surface area between the fuel cell connection component and the pad, measuring the voltage drop across the component using the Grafoil™ pad can help to distinguish resistance caused by contact resistance between the component and the electrode versus the bulk resistance of the component. As can be seen from the results reported below in Table 1, the 45° configuration can cause between an about 20% to about 26% improvement over the "standard" configuration. Additionally, the smaller measured differences in resistance between the 90° configuration and the 45° configuration as measured when using the Grafoil™ pad as compared to the larger differences when measured without the Grafoil™ pad is evidence that, in these embodiments, the 45° configuration has a lower contact resistance (e.g. increased interfacial area) than the 90° configuration, and that the 45° configuration has a lower bulk resistance than the 90° configuration, but that the difference between the contact resistance of the 45° configuration and the 90° configuration is greater than the difference between the bulk resistance of the 45° configuration and the 90° configuration.

TABLE 1

| Sample | mV drop at 0.5 A | mV drop at 0.5 A with Grafoil ™ pad on top |
| --- | --- | --- |
| 8 × Standard CC | 22 | 7.2 |
| 8 × Standard CC | 21.5 | 7.3 |
| 8 × 45° CC | 9.4 | 5.2 |
| 8 × 45° CC | 13.8 | 5.5 |
| 12 × Standard CC | 34 | 3.3 |
| 12 × 45° CC | 17 | 1.3 |

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

Additional Embodiments

The present invention provides for the following exemplary embodiments, the numbering of which is not to be construed as designating levels of importance:

Embodiment 1 provides a fuel cell connection component, including: a non-conductive interface region having a first surface and a second surface; an electron conducting component having two surfaces and a length that is parallel to the two surfaces of the electron conducting component, wherein one of the surfaces of the electron conducting component is disposed adjacent to the second surface of the interface region, the electron conducting component including conductive fibers oriented approximately parallel to the two surfaces of the electron conducting component and adapted to be oriented at an angle of less than about 90° to at least one electrode in a fuel cell; and a binder, wherein the binder holds the interface region and the electron conducting component together; wherein the fuel cell connection component is adapted for use in the fuel cell such that it provides an electrically conductive pathway between the at least one electrode of the fuel cell and an external circuit or between the at least one electrode of the fuel cell and at least one electrode of a different fuel cell, said path extending along the length of the electron conducting component.

Embodiment 2 provides the fuel cell connection component of Embodiment 1, wherein the conductive fibers are adapted to be oriented at an angle of between about 22° and about 68° to the at least one electrode of the fuel cell.

Embodiment 3 provides the fuel cell connection component of any one of Embodiments 1-2, wherein the conductive fibers are adapted to be oriented at an angle of about 45° to the one electrode of the fuel cell.

Embodiment 4 provides the fuel cell connection component of any one of Embodiments 1-3, wherein the conductive fibers include at least a first set of conductive fibers and a second set of conductive fibers, wherein both the first and second set of conductive fibers are adapted to be oriented at an angle of less than about 90° to the at least one electrode in the fuel cell, wherein the first set of conductive fibers and the second set of conductive fibers are oriented such that the first set of conductive fibers forms an angle of approximately 45° to about 135° with the second set of conductive fibers.

Embodiment 5 provides the fuel cell connection component of any one of Embodiments 1-4, wherein the conductive fibers include at least a first set of conductive fibers and a second set of conductive fibers, wherein both the first and second set of conductive fibers are adapted to be oriented at an angle of less than about 90° to the at least one electrode in the fuel cell, wherein the first set of conductive fibers and the second set of conductive fibers are oriented such that the first set of conductive fibers forms an angle of approximately 90° with the second set of conductive fibers.

Embodiment 6 provides the fuel cell connection component of any one of Embodiments 1-5, wherein the binder includes an adhesive selected from an epoxy or a resin.

Embodiment 7 provides the fuel cell connection component of any one of Embodiments 1-6, wherein the interface region includes glass fibers.

Embodiment 8 provides the fuel cell connection component of any one of Embodiments 1-7, wherein the fuel cell connection component includes a current collector, wherein the current collector is adapted for use in the fuel cell such that it provides an electrically conductive path between the at least one electrode of the fuel cell and at least one electrode of a different fuel cell.

Embodiment 9 provides the fuel cell connection component of any one of Embodiments 1-8, wherein the electron conducting component includes a first electrically conductive material, wherein the first electrically conductive material includes the conductive fibers.

Embodiment 10 provides the fuel cell connection component of any one of Embodiments 1-9, wherein the conductive fibers include carbon fibers.

Embodiment 11 provides the fuel cell connection component of any one of Embodiments 1-10, wherein the fuel cell connection component includes an interconnect, wherein the interconnect is adapted for use in the fuel cell such that it provides an electrically conductive path between the at least one electrode of the fuel cell and an external circuit.

Embodiment 12 provides the fuel cell connection component of any one of Embodiments 1-11, wherein the electron conducting component includes two electron conducting regions, each electron conducting region being defined between two surfaces parallel to the length of the electron conducting component.

Embodiment 13 provides the fuel cell connection component of any one of Embodiments 1-12, wherein: the electron conducting component includes a first electron conducting region including a first electrically conductive material, and a second electron conducting region including a second electrically conductive material; and wherein the first electrically conductive material is corrosion-resistant and the conductivity of the second electrically conductive material is greater than the conductivity of the second electrically conductive material.

Embodiment 14 provides the fuel cell connection component of Embodiment 13, wherein the second electrically conductive material is selected from the group consisting of a metal, a metal alloy, and combinations thereof.

Embodiment 15 provides the fuel cell connection component of any one of Embodiments 13-14, wherein the second electrically conductive material includes conductive fibers oriented approximately parallel to the two surfaces of the electron conducting component and adapted to be oriented at an angle of less than about 90° to one of the electrode coatings of the fuel cell.

Embodiment 16 provides the fuel cell connection component of Embodiment 15, wherein the conductive fibers of the second electrically conductive material include copper metal fibers.

Embodiment 17 provides the fuel cell connection component of any one of Embodiments 13-16, wherein the first electrically conductive material includes conductive fibers oriented approximately parallel to the two surfaces of the electron conducting component and adapted to be oriented at an angle of less than about 90° to the one of the electrode coatings of the fuel cell.

Embodiment 18 provides the fuel cell connection component of Embodiment 17, wherein the conductive fibers of the first electrically conductive material include carbon fibers.

Embodiment 19 provides the fuel cell connection component of any one of Embodiments 13-18, wherein the electron conducting component includes two first electron conducting regions.

Embodiment 20 provides the fuel cell connection component of any one of Embodiments 13-19, wherein the electron conducting component and the interface region are bonded together to form a composite.

Embodiment 21 provides the fuel cell connection component of any one of Embodiments 13-20, further including a third electron conducting region that includes the first electrically conductive material.

Embodiment 22 provides the fuel cell connection component of Embodiment 21, wherein the first electron conducting region is disposed on a first side of the second electron conducting region and the third electron conducting region is disposed on a second side of the second electron conducting region and the first and second sides of the second electron conducting region are opposite relative to one another.

Embodiment 23 provides the fuel cell connection component of any one of Embodiments 1-22, wherein the interface region is adapted to be in contact with an ion conducting component of the fuel cell.

Embodiment 24 provides a fuel cell, including: an ion conducting component; two or more electrode coatings; and one or more fuel cell connection components, the fuel cell connection components including a non-conductive interface region having a first surface and a second surface, in which the first surface of the non-conductive interface is in contact with the ion conducting component; an electron conducting component having two surfaces and a length that is parallel to the two surfaces of the electron conducting component, wherein one of the surfaces of the electron conducting component is disposed adjacent to the second surface of the interface region, the electron conducting component including conductive fibers oriented approximately parallel to the two surfaces of the electron conducting component and oriented at an angle of less than about 90° to one of the electrode coatings; wherein the electron conducting component provides an electrically conductive pathway between the one electrode coating and an external circuit or between the one electrode coating and an electrode coating of another fuel cell, said pathway extending along the length of the electron conducting component.

Embodiment 25 provides the fuel cell of Embodiment 24, wherein the conductive fibers are oriented at an angle of between about 22° and about 68° to the one of the electrode coatings.

Embodiment 26 provides the fuel cell of any one of Embodiments 24-25, wherein the conductive fibers include at least a first set of conductive fibers and a second set of conductive fibers, wherein both the first and second set of conductive fibers are oriented at an angle of less than about 90° to the at least one electrode in the fuel cell, wherein the first set of conductive fibers and the second set of conductive fibers are oriented such that the first set of conductive fibers forms an angle of between approximately 45° and about 135° with the second set of conductive fibers.

Embodiment 27 provides the fuel cell of any one of Embodiments 24-26, wherein the fuel cell connection component includes a current collector, wherein the fuel cell connection component provides an electrically conductive pathway between the one electrode coating and the electrode coating of another fuel cell.

Embodiment 28 provides the fuel cell of any one of Embodiments 24-27, wherein the electron conducting component includes a first electrically conductive material, wherein the first electrically conductive material includes the conductive fibers.

Embodiment 29 provides the fuel cell of any one of Embodiments 24-28, wherein the fuel cell connection component includes an interconnect, wherein the fuel cell connection component provides an electrically conductive pathway between the one electrode coating and an external circuit Embodiment 30 provides the fuel cell of any one of Embodiments 24-29, wherein the electron conducting component includes two electron conducting regions, each electron conducting region being defined between two surfaces parallel to the length of the electron conducting component.

Embodiment 31 provides the fuel cell of any one of Embodiments 24-30, wherein: the electron conducting component includes a first electron conducting region including a first electrically conductive material including conductive fibers oriented approximately parallel to the two surfaces of the electron conducting component and oriented at an angle of less than about 90° to the one of the electrode coatings, and a second electron conducting region including a second electrically conductive material including conductive fibers oriented approximately parallel to the two surfaces of the electron conducting component and oriented at an angle of less than about 90° to one of the electrode coatings; and wherein the first electrically conductive material is corrosion-resistant and the conductivity of the second electrically conductive material is greater than the conductivity of the second electrically conductive material.

Embodiment 32 provides the fuel cell of Embodiment 31, wherein the second electrically conductive material is selected from the group consisting of a metal, a metal alloy, and combinations thereof.

Embodiment 33 provides the fuel cell of any one of Embodiments 31-32, wherein the conductive fibers of the second electrically conductive material include copper metal fibers.

Embodiment 34 provides the fuel cell of any one of Embodiments 31-33, wherein the conductive fibers of the first electrically conductive material include carbon fibers.

Embodiment 35 provides a fuel cell layer, including: a composite layer having a first surface and a second surface, the composite layer including a plurality of fuel cell connection components; and a plurality of ion conducting components, positioned between the fuel cell connection components; a first plurality of electrode coatings disposed on the first surface to form anodes; and a second plurality of electrode coatings disposed on the second surface to form cathodes, each of the first and second plurality of electrode coatings in ionic contact with one of the ion conducting components and in electrical contact with one of the fuel cell connection components; wherein at least one of the fuel cell connection components includes an interface region having a first surface and a second surface, the first surface in contact with one of the ion conducting components; and at least one electron conducting component having two surfaces and a length parallel to the two surfaces, one of the surfaces of the at least one electron conducting component disposed adjacent to the second surface of the interface region, wherein the at least one electron conducting component includes conductive fibers oriented approximately parallel to the two surfaces of the at least one electron conducting component and oriented at an angle of less than about 90° to at least one of the first or second plurality of electrode coatings; wherein the at least one of the fuel cell connection components provides an electrically conductive pathway between the at least one of the first or second plurality of electrode coatings and an external circuit or between the at least one of the first or second plurality of electrode coatings and a different one of the first or second plurality of electrode coatings, said pathway extending along the length of the at least one electron conducting component.

Embodiment 36 provides the fuel cell connection component of Embodiment 35, wherein the conductive fibers include at least a first set of conductive fibers and a second set of conductive fibers, wherein both the first and second set of conductive fibers are oriented at an angle of less than about 90° to the at least one electrode in the fuel cell, wherein the first set of conductive fibers and the second set of conductive fibers are oriented such that the first set of conductive fibers forms an angle of between approximately 45° and about 135° with the second set of conductive fibers.

Embodiment 37 provides the fuel cell layer of any one of Embodiments 35-36, wherein the conductive fibers include carbon fibers.

Embodiment 38 provides the fuel cell layer of any one of Embodiments 35-37, wherein at least one of the electron conducting components includes at least two electron conducting materials, including a first electron conducting material and a second electron conducting material.

Embodiment 39 provides the fuel cell layer of Embodiment 38, wherein the first electron conducting material is substantially corrosion resistant, and wherein the second electron conducting material has an electrical conductivity greater than that of the first electron conducting material.

Embodiment 40 provides the fuel cell layer of any one of Embodiments 38-39, wherein the first electron conducting material includes carbon fibers, wherein the second electron conducting material includes copper fibers.

Embodiment 41 provides the fuel cell layer of any one of Embodiments 39-40, wherein the first electron conducting material is in electrical contact with one of the first or the second plurality of electrode coatings.

Embodiment 42 provides the fuel cell layer of Embodiment 41, wherein the second electron conducting material is in electrical contact with both the first electron conducting material and the external circuit, providing the electrically conductive pathway between the electrode coating and the external circuit.

Embodiment 43 provides the apparatus or method of any one or any combination of Embodiments 1-42 optionally configured such that all elements or options recited are available to use or select from.

What is claimed, is:

1. A fuel cell connection component, comprising:
an electrically non-conductive interface region having a first surface and a second surface, the first and second surface of the interface region being parallel to an x-z plane, the x-z plane having an x-y plane perpendicular thereto;
an electron conducting component having two surfaces parallel to the x-z plane and a length that is parallel to the x-z plane, wherein one of the surfaces of the electron conducting component is disposed adjacent to the second surface of the interface region, the electron conducting component comprising
conductive fibers oriented parallel to the x-z plane and configured to be oriented at an angle of greater than 0° and less than 90° to a first or second surface of at least one electrode in a fuel cell, wherein the first and second surface of the electrode are parallel to the x-y plane, the first and second surfaces of the electrode being the largest two surfaces of the electrode; and a binder, wherein the binder holds the interface region and the electron conducting component together;

wherein the fuel cell connection component is configured for use in the fuel cell such that it provides an electrically conductive pathway between the at least one electrode of the fuel cell and an external circuit or between the at least one electrode of the fuel cell and at least one electrode of a different fuel cell, said path extending along the length of the electron conducting component.

2. The fuel cell connection component of claim 1, wherein the conductive fibers are configured to be oriented at an angle of between 22° and 68° to the first or second surface of the at least one electrode.

3. The fuel cell connection component of claim 1, wherein the conductive fibers are configured to be oriented at an angle of 45° to the first or second surface of the at least one electrode.

4. The fuel cell connection component of claim 1, wherein the conductive fibers comprise at least a first set of conductive fibers and a second set of conductive fibers, wherein both the first and second set of conductive fibers are configured to be oriented at an angle of less than 90° to the first or second surface of the at least one electrode in the fuel cell, wherein the first set of conductive fibers and the second set of conductive fibers are oriented such that the first set of conductive fibers forms an angle of 45° to 135° with the second set of conductive fibers.

5. The fuel cell connection component of claim 1, wherein the conductive fibers comprise at least a first set of conductive fibers and a second set of conductive fibers, wherein both the first and second set of conductive fibers are configured to be oriented at an angle of less than 90° to the first or second surface of the at least one electrode in the fuel cell, wherein the first set of conductive fibers and the second set of conductive fibers are oriented such that the first set of conductive fibers forms an angle of 90° with the second set of conductive fibers.

6. The fuel cell connection component of claim 1, wherein the binder comprises an adhesive selected from an epoxy or a resin.

7. The fuel cell connection component of claim 1, wherein the interface region comprises glass fibers.

8. The fuel cell connection component of claim 1, wherein the fuel cell connection component comprises a current collector, wherein the current collector is configured for use in the fuel cell such that it provides an electrically conductive path between the at least one electrode of the fuel cell and at least one electrode of a different fuel cell.

9. The fuel cell connection component of claim 1, wherein the electron conducting component comprises a first electrically conductive material, wherein the first electrically conductive material comprises the conductive fibers.

10. The fuel cell connection component of claim 1, wherein the conductive fibers comprise carbon fibers.

11. The fuel cell connection component of claim 1, wherein the fuel cell connection component comprises an interconnect, wherein the interconnect is configured for use in the fuel cell such that it provides an electrically conductive path between the at least one electrode of the fuel cell and an external circuit.

12. The fuel cell connection component of claim 1 wherein the electron conducting component comprises two electron conducting regions, each electron conducting region being defined between two surfaces parallel to the length of the electron conducting component.

13. The fuel cell connection component of claim 1, wherein:

the electron conducting component comprises a first electron conducting region comprising a first electrically conductive material, and a second electron conducting region comprising a second electrically conductive material; and wherein the first electrically conductive material is corrosion-resistant and the conductivity of the second electrically conductive material is greater than the conductivity of the second electrically conductive material.

14. The fuel cell connection component of claim 13, wherein the second electrically conductive material comprises a metal, a metal alloy, or combinations thereof.

15. The fuel cell connection component of claim 13, wherein the second electrically conductive material comprises conductive fibers oriented parallel to the x-z plane and configured to be oriented at an angle of less than 90° to the first or second surface of the at least one electrode.

16. The fuel cell connection component of claim 15, wherein the conductive fibers of the second electrically conductive material comprise copper metal fibers.

17. The fuel cell connection component of claim 13, wherein the first electrically conductive material comprises conductive fibers oriented parallel to the x-z and configured to be oriented at an angle of less than 90° to the first or second surface of the at least one electrode.

18. The fuel cell connection component of claim 17, wherein the conductive fibers of the first electrically conductive material comprise carbon fibers.

19. The fuel cell connection component of claim 1, wherein the interface region is configured to be in contact with an ion conducting component of the fuel cell.

20. A fuel cell, comprising:

an ion conducting component;

two or more electrode coatings, each electrode coating independently comprising a first surface and a second surface, wherein the first and second surface of the electrode coatings are parallel to an x-y plane, the x-y plane having an x-z plane perpendicular thereto, the first and second surfaces being the largest two surfaces of each of the electrode coatings; and one or more fuel cell connection components, the fuel cell connection components comprising an electrically, non-conductive interface region having a first surface and a second surface, the first and second surface of the interface region being parallel to the x-z plane, in which the first surface of the non-conductive interface is in contact with the ion conducting component;

an electron conducting component having two surfaces parallel to the x-z plane and a length that is parallel to the x-z plane, wherein one of the surfaces of the electron conducting component is disposed adjacent to the second surface of the interface region, the electron conducting component comprising conductive fibers oriented parallel to the x-z plane and oriented at an angle of greater than 0° and less than 90° to the first or second surface of one of the electrode coatings;

wherein the electron conducting component provides an electrically conductive pathway between the one electrode coating and an external circuit or between the one electrode coating and an electrode coating of another fuel cell, said pathway extending along the length of the electron conducting component.

21. A fuel cell layer, comprising:
a composite layer having a first surface and a second surface, the composite layer comprising
 a plurality of fuel cell connection components; and
 a plurality of ion conducting components, positioned between the fuel cell connection components;
a first plurality of electrode coatings disposed on the first surface to form anodes; and
a second plurality of electrode coatings disposed on the second surface to form cathodes, each of the first and second plurality of electrode coatings in ionic contact with one of the ion conducting components and in electrical contact with one of the fuel cell connection components, each of the first and second plurality of electrode coatings independently comprising a first surface and a second surface, each of the first and second surfaces of the electrode coatings being parallel to an x-y plane, the x-y plane having an x-z plane perpendicular thereto, the first and second major surfaces of the electrode coatings being the largest two surfaces of each of the electrode coatings:
wherein at least one of the fuel cell connection components comprises
 an electrically non-conductive interface region having a first surface and a second surface, the first and second surface of the interface region being parallel to the x-z plane, the first surface in contact with one of the ion conducting components; and
 at least one electron conducting component having two surfaces parallel to the x-z plane and a length parallel to the x-z plane, one of the surfaces of the at least one electron conducting component disposed adjacent to the second surface of the interface region, wherein the at least one electron conducting component comprises
  conductive fibers oriented parallel to the x-z plane and oriented at an angle of greater than 0" and less than 90° to the first or second surface of at least one of the first or second plurality of electrode coatings;
wherein the at least one of the fuel cell connection components provides an electrically conductive pathway between the at least one of the first or second plurality of electrode coatings and an external circuit or between the at least one of the first or second plurality of electrode coatings and a different one of the first or second plurality of electrode coatings, said pathway extending along the length of the at least one electron conducting component.

* * * * *

UNITED STATES PATENT AND TRADEMARK OFFICE
CERTIFICATE OF CORRECTION

| | | |
|---|---|---|
| PATENT NO. | : 8,785,077 B2 | Page 1 of 1 |
| APPLICATION NO. | : 13/172645 | |
| DATED | : July 22, 2014 | |
| INVENTOR(S) | : Schrooten et al. | |

It is certified that error appears in the above-identified patent and that said Letters Patent is hereby corrected as shown below:

In the Claims,

In column 32, line 46, in Claim 20, delete "electrically," and insert --electrically--, therefor In column 33, line 21, in Claim 21, delete "coatings:" and insert --coatings;--, therefor In column 34, line 12, in Claim 21, delete "0"" and insert --0°--, therefor Signed and Sealed this
Eighteenth Day of November, 2014

Michelle K. Lee
*Deputy Director of the United States Patent and Trademark Office*